(12) United States Patent
Rajasekaran et al.

(10) Patent No.: US 7,634,470 B2
(45) Date of Patent: Dec. 15, 2009

(54) EFFICIENT SEARCHING TECHNIQUES

(75) Inventors: Sanguthevar Rajasekaran, Los Altos, CA (US); Rajendra A. Gopalakrishna, Bangalore (IN)

(73) Assignee: Arcot Systems, Inc., Santa Clara, CA (US)

( * ) Notice: Subject to any disclaimer, the term of this patent is extended or adjusted under 35 U.S.C. 154(b) by 873 days.

(21) Appl. No.: 11/189,185

(22) Filed: Jul. 25, 2005

(65) Prior Publication Data

US 2005/0256890 A1 Nov. 17, 2005

Related U.S. Application Data

(62) Division of application No. 10/006,179, filed on Dec. 4, 2001, now Pat. No. 6,959,303.

(60) Provisional application No. 60/262,320, filed on Jan. 17, 2001.

(51) Int. Cl.
*G06F 7/00* (2006.01)
*G06F 17/30* (2006.01)
*G06F 17/00* (2006.01)

(52) U.S. Cl. .............................. 707/4; 707/3; 707/102

(58) Field of Classification Search ........................ None
See application file for complete search history.

(56) References Cited

U.S. PATENT DOCUMENTS

| | | | | |
|---|---|---|---|---|
| 4,606,002 A * | 8/1986 | Waisman et al. | ................ | 707/3 |
| 5,202,986 A | 4/1993 | Nickel | | |
| 5,495,609 A * | 2/1996 | Scott | .............................. | 707/8 |
| 5,787,430 A * | 7/1998 | Doeringer et al. | ........... | 707/100 |
| 6,014,659 A * | 1/2000 | Wilkinson et al. | ............. | 707/3 |
| 6,131,092 A | 10/2000 | Masand | | |
| 6,182,069 B1 | 1/2001 | Niblack et al. | | |
| 6,230,154 B1 | 5/2001 | Raz et al. | | |
| 6,240,418 B1 * | 5/2001 | Shadmon | ..................... | 707/100 |
| 6,249,788 B1 * | 6/2001 | Ronstrom | .................... | 707/101 |
| 6,353,823 B1 | 3/2002 | Kumar | | |
| 6,363,488 B1 | 3/2002 | Ginter et al. | | |
| 6,389,412 B1 | 5/2002 | Light | | |

(Continued)

FOREIGN PATENT DOCUMENTS

WO    WO 02/057883 A2    7/2002

(Continued)

OTHER PUBLICATIONS

Dietzfelbinger et al., "Polynomial hash functions are reliable," *Proc. ICALP 1992*, pp. 235-246.

(Continued)

*Primary Examiner*—Hosain T Alam
*Assistant Examiner*—Shew-Fen Lin
(74) *Attorney, Agent, or Firm*—Townsend and Townsend and Crew LLP

(57) ABSTRACT

The present invention describes techniques for performing searches in an efficient manner while minimizing the memory resources required to perform the searches. According to the techniques of the present invention, the number of comparisons needed to determine if a query element is in included in a set of elements is proportional to the length of the query element and independent of the number of elements in the set of elements.

9 Claims, 11 Drawing Sheets

U.S. PATENT DOCUMENTS

| | | | |
|---|---|---|---|
| 6,427,140 | B1 | 7/2002 | Ginter et al. |
| 6,614,789 | B1 | 9/2003 | Yazdani et al. |
| 6,675,173 | B1 * | 1/2004 | Shadmon .................... 707/102 |
| 6,735,595 | B2 * | 5/2004 | Gobeille et al. ............ 707/102 |
| 2002/0103809 | A1 | 8/2002 | Starzl et al. |

FOREIGN PATENT DOCUMENTS

| | | |
|---|---|---|
| WO | WO 02/057883 A3 | 7/2002 |

OTHER PUBLICATIONS

Faloutsos, C., "Access methods for text," *ACM Computing Surveys*, 17(1):49-74 (1985).

Gonnet et al., *Handbook of Algorithms and Data Structures*, pp. 130-133, Addison-Wesley, Reading, MA (1991).

Horwitz et al., *Computer Algorithms*, pp. 131-137, W. H. Freeman Press (1998).

Manber et al., "GLIMPSE: A tool to search through entire file systems," Technical Report 93-94, Department of Computer Science, The University of Arizona, Tucson, Oct. 1993.

Knuth, D. E., *The Art of Computer Programming vol. 3: Sorting and Searching*, pp. 481-485, Addison-Wesley Publishers (1976).

Perl et al., "Interpolation Search—A Log Log$N$ Search," *Communications of the ACM*, 21(7):550-553 (1978).

Salton et al., *Introduction to Modern Information Retrieval*, McGraw-Hill, New York, 1983. [section related to description of index files].

Van Emde Boas et al., "Design and Implementation of an Efficient Priority Queue," *Mathematical Systems Theory*, 10:99-127 (1977).

Wu et al., "Agrep—a fast approximate pattern-matching tool," *Proc. Usenix Winter 1992 Technical Conference*, pp. 153-162 held in San Francisco Jan. 1992.

Wu et al., "Fast Text Searching Allowing Errors," *Communications of the ACM*, 35:83-91 (1992).

Oracle, "Oracle Internet Filesystem (iFS) FAQ," downloaded from http://www.orafaq.com/faqifs.htm, 3 pages, Dec. 18, 2000.

* cited by examiner

EFFICIENT SEARCHING TECHNIQUES

CROSS-REFERENCES TO RELATED APPLICATIONS

The present application claims priority to and is a divisional application of U.S. Non-Provisional application Ser. No. 10/006,179, entitled "EFFICIENT SEARCHING TECHNIQUES" filed on Dec. 4, 2001, which claims priority to U.S. Provisional Application No. 60/262,320, entitled "TECHNIQUES TO FACILITATE EFFICIENT SEARCHING" filed on Jan. 17, 2001. The entire contents of the aforementioned applications are herein incorporated by reference for all purposes.

BACKGROUND OF THE INVENTION

The present invention relates to search techniques and more particularly to techniques that enable searches to be performed in an efficient manner while minimizing the memory resources required to perform the searches.

Searching is an important and extensively used operation in computer applications. For example, a list of files on a file server may be searched to determine if the list includes a file with a specific filename, a list of uniform resource identifiers (URIs) may be searched to determine if a user-specified URI is in the list, a list of available resources may be searched by an access control application to locate a resource and to determine access rights associated with the resource, a file's contents may be searched to determine if a particular keyword is included in the contents, and several other applications.

One sector that has seen a heightened demand for efficient search techniques is the area of electronic commerce activities. Merchants and other entities who provide online commercial services need to use fast and efficient search techniques to be able to respond to customer requests in a timely manner. In order to maximize their profits, the online merchants also prefer to use search techniques that require minimal amounts of memory and computing resources to perform the searches so as to minimize costs associated with the searches. For example, online banking institutions and credit card companies who authorize payments for online commerce activities need to use efficient search techniques to process consumer requests in a timely manner while minimizing costs associated with the searches. Accordingly, there is an increasing demand for search techniques which perform searches in a timely manner while using minimal memory and computing resources to perform the searches.

There are a number of different approaches to searching. According to one approach, searching can be modeled as follows: given a set S comprising "n" elements "$k_1, k_2, \ldots k_n$" (i.e., $S=(k_1, k_2, \ldots, k_n)$) elements from some domain $\Sigma$, and a target or query element k from domain $\Sigma$(i.e., $k \in \Sigma$), searching is a process that determines if target element k is included in set S (i.e., if $k \in S$). The searching process might also include processing to determine the location of the target element in $\Sigma$. Domain $\Sigma$ can be any arbitrary domain, e.g., the set of integers, the set of real numbers, a set of strings of characters, etc. The set S might manifest itself in various forms, for example, set S might be a collection of files forming a file system, a list of URIs, a list of resources, etc. Each element $k_n$ of set S may comprise one or more characters from a character set of domain $\Sigma$. Search techniques typically attempt to minimize the time and processing resources needed to determine if $k \in S$.

One method of measuring the efficiency of a search technique is to determine the number of comparisons needed by the search technique to determine if a query element k is included in set S. Since each comparison requires a specific unit of time to be performed, search techniques strive to reduce the number of comparisons required to determine if a query element k is included in set S. In general, the term "comparison" may refer to comparing any two values. A value may correspond to an element of domain $\Sigma$ comprising one or more characters, a character of an element of domain $\Sigma$, and the like. Accordingly, a comparison that compares an element of domain $\Sigma$ with another element of domain $\Sigma$ is referred to as an "element comparison." A comparison that compares a character of an element of domain $\Sigma$ with a character of another element is referred to as a "character comparison." An element comparison may involve one or more character comparisons. For example, when a first element is compared with a second element, the comparison may compare individual characters of the first element with characters of the second element. Since each element of $\Sigma$ can be of arbitrary length (i.e., have variable number of characters), each comparison may require more than a "unit of time" to perform the comparison.

Several conventional search techniques have been developed to solve the search problem. According to one brute-force search technique, the query element k is compared with every element in set S. This technique may require up to "n" element comparisons to perform the search, where n is the number of elements in set S. Accordingly, if n is very large (which is quite often the case), the runtime performance of such a search technique is not very optimal.

Several other conventional search techniques require that the set S be in sorted order. For example, a binary search technique may be used to determine if $k \in S$ provided that the elements of S are in sorted order. The binary search techniques require $\Theta(\log n)$ element comparisons to complete the search (where n is the number of elements in set S). However, the application of such search techniques is quite limited because of the pre-requisite that the set of elements to be searched has to be in sorted order. The costs involved in keeping a data set in a sorted order add to the overall cost of the search and render the use of such search techniques impractical in many applications (especially in applications where the data set to be searched is large and there are frequent additions and deletions of elements from the data set, e.g., applications in an electronic commerce environment). As a result, the use of such search techniques is limited.

Other search techniques are based upon the assumption that $\Sigma$ is appropriately restricted, or that set S has a certain distribution on $\Sigma$, etc. For example, if $\Sigma=\{1, 2, \ldots, N\}$, the search technique (referred to as "interpolation search") disclosed in "P. van Emde Boas, R. Kaas, and E. Zijlstra, *Design and Implementation of an Efficient Priority Queue, Mathematical Systems Theory* 10, 1977, pp. 99-127" can perform the search in O(log log N) time using O(n) total memory. The van Emde et al. technique uses a dictionary (i.e., a data structure that supports insert, delete, and search operations) where each operation takes O(log log N) time. For example if $\Sigma$ is the domain of all character strings of length at most 150 (and assuming there are 50 characters in the character set for $\Sigma$), then the number of comparisons required to perform the search will be at least (log log$50^{150}$ =10) comparisons, i.e., the search time will be at least 10 comparisons. If it is assumed that set S is uniformly distributed in (0,1), the van Emde et al. technique (also referred to as an "interpolation search technique") can search in an expected O(log log n) time. However, a disadvantage of these search techniques is that they cannot be applied to any arbitrary domain $\Sigma$. Further, these techniques require substantial memory resources to perform the search, and as a result are not very cost effective when the data set to be searched is large.

Dictionaries may also be defined such that only one comparison is required to determine if k∈S. For example, if $\Sigma=\{1, 2, \ldots, N\}$ (i.e., $|\Sigma|=N$; domain $\Sigma$ comprise N elements). If we have a memory of size $\Omega(N)$, then a dictionary may be implemented as follows. Label the elements of $\Sigma$ as $1, 2, \ldots, N$. An array $A[1:N]$ (i.e., an array "A" comprising N elements) may be configured such that $A[b]$ corresponds to element b in domain $\Sigma$. Initially, all the array locations are initialized to zero. Then, for every element $k_i$ in set S, $A[k_i]$ is set to 1 for $1 \leq i \leq n$ (where n is the number of elements in set S). A determination if k∈S may then be performed by determining if $A[k]=1$ (which indicates presence of the element). While this type of dictionary can accomplish the search in $O(1)$ time, the memory resources required for this technique can be very large, especially if N is large. For example if $\Sigma$ is the domain of all character strings of length at most 150, then N will be $50^{150}$ assuming that there are 50 different characters. Accordingly, while the run time performance of such a technique is very optimal, the vast amounts of memory resources required by this technique make it impracticable for most applications.

In light of the above, there is a need for search techniques which can perform searches in an efficient manner while minimizing the memory resources required to perform the searches.

BRIEF SUMMARY OF THE INVENTION

The present invention provides techniques for performing searches in an efficient manner while minimizing the memory resources required to perform the searches. According to the techniques of the present invention, the number of comparisons needed to determine if a query element is in included in a set of elements is proportional to the length of the query element.

According to an embodiment of the present invention, techniques are provided for determining if a query element is included in set of elements. According to this embodiment, a data structure is built based upon information identifying the set of elements. Upon receiving information identifying the query element, the embodiment of the present invention uses the data structure to determine if the query element is included in the set of elements such that the number of comparisons needed to determine if the query element is included in the set of elements is proportional to the length of the query element and independent of the number of elements in the set of elements.

The foregoing, together with other features, embodiments, and advantages of the present invention, will become more apparent when referring to the following specification, claims, and accompanying drawings.

DETAILED DESCRIPTION OF THE INVENTION

The present invention provides techniques for performing searches in an efficient manner while minimizing the memory resources required to perform the searches. The search techniques according to the teachings of the present invention determine if a search query element k from an arbitrary domain $\Sigma$ (i.e., k∈$\Sigma$) is included in a set S (i.e., if k∈S) comprising "n" elements "$k_1, k_2, \ldots k_n$" (i.e., $S=(k_1, k_2, \ldots, k_n)$) from domain $\Sigma$. Each element in domain $\Sigma$ (and subsequently each element in set S) may comprise one or more characters from a character set of domain $\Sigma$.

Figure 1:
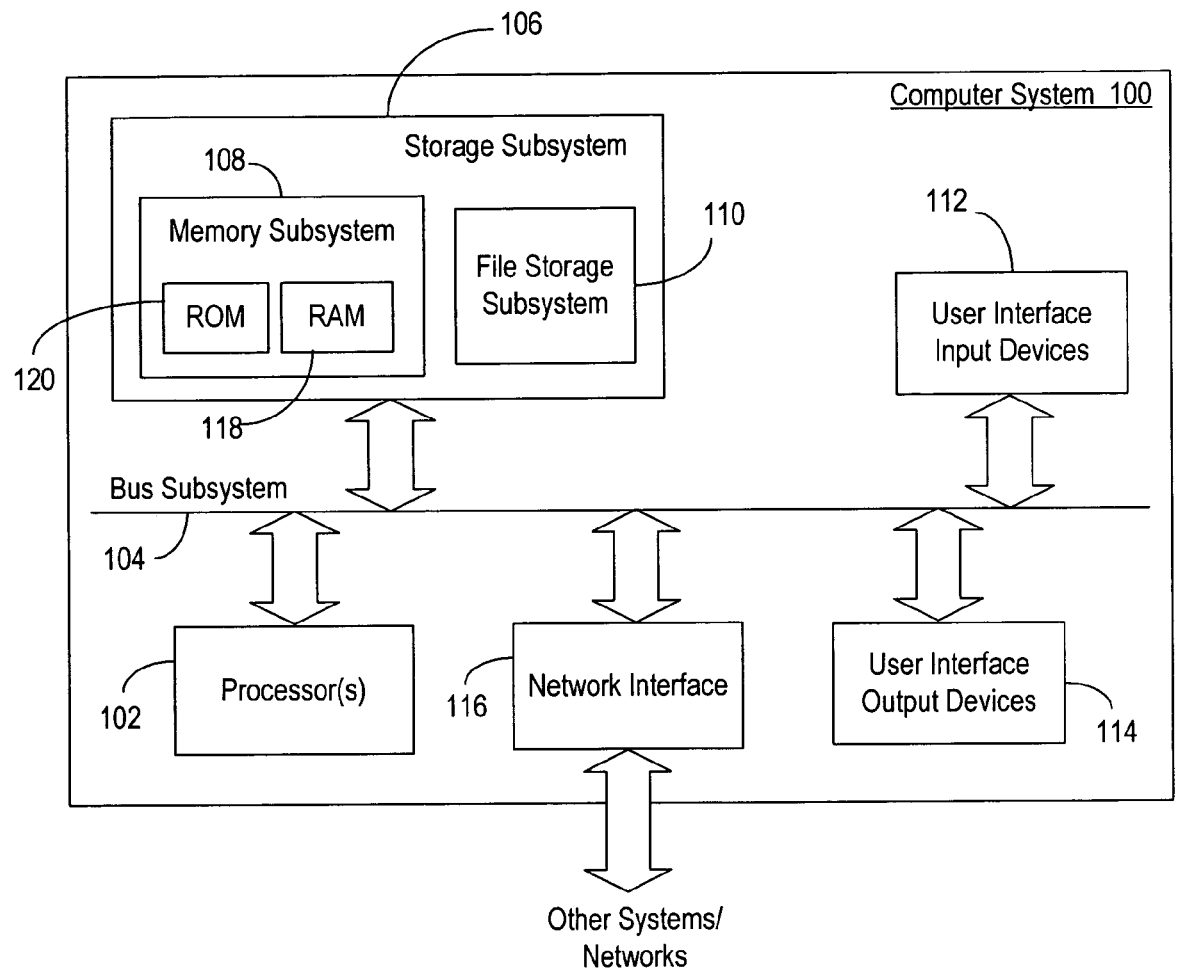
FIG. 1 is a simplified block diagram of a computer system that may incorporate an embodiment of the present invention.

FIG. 1 is a simplified block diagram of a computer system 100 that may incorporate an embodiment of the present invention. As shown in FIG. 1, computer system 100 includes at least one processor 102, which communicates with a number of peripheral devices via a bus subsystem 104. These peripheral devices may include a storage subsystem 106, comprising a memory subsystem 108 and a file storage subsystem 110, user interface input devices 112, user interface output devices 114, and a network interface subsystem 116. The input and output devices allow user interaction with computer system 100. A user may be a human user, a device, a process, another computer, and the like.

Network interface subsystem 116 provides an interface to other computer systems and communication networks. Embodiments of network interface subsystem 116 include an Ethernet card, a modem (telephone, satellite, cable, ISDN, etc.), (asynchronous) digital subscriber line (DSL) units, and the like. The computer networks may include the Internet, local area networks (LANs), wide area networks (WAN), wireless networks, intranets, private networks, public networks, switched networks, and the like.

User interface input devices 112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 100.

User interface output devices 114 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 100.

Storage subsystem 106 may be configured to store the basic programming and data constructs that provide the functionality of the computer system and of the present invention. For example, according to an embodiment of the present invention, software modules implementing the functionality of the present invention may be stored in storage subsystem 106. These software modules may be executed by processor(s) 102. In a distributed environment, the software modules may be stored on a plurality of computer systems and executed by processors of the plurality of computer systems. Storage subsystem 106 may also provide a repository for storing various databases and data structures that may be used to store information according to the teachings of the present invention. Storage subsystem 106 may comprise memory subsystem 108 and file storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

Bus subsystem 104 provides a mechanism for letting the various components and subsystems of computer system 100 communicate with each other as intended. The various subsystems and components of computer system 100 need not be at the same physical location but may be distributed at various locations. Although bus subsystem 104 is shown schematically as a single bus, alternative embodiments of the bus subsystem may utilize multiple busses.

Computer system 100 itself can be of varying types including a personal computer, a portable computer, a workstation, a computer terminal, a network computer, a mainframe, a kiosk, a personal digital assistant (PDA), a communication device such as a cell phone, an entertainment console (PS2, X-box), or any other data processing system. Due to the ever-changing nature of computers, the description of computer system 100 depicted in FIG. 1 is intended only as a specific example for purposes of illustrating the preferred embodiment of the present invention. For example, other types of processors are contemplated, such as the Athlon™ class microprocessors from AMD, the Pentium™-class or Celeron™-class microprocessors from Intel Corporation, PowerPC™ G3 or G4 microprocessors from Motorola, Inc., Crusoe™ processors from Transmeta, Inc. and the like. Further, other types of operating systems are contemplated in alternative embodiments including Windows operating systems (e.g., Win95, Win98, WindowsNT™, WindowsXP™, etc.) from Microsoft, Solaris from Sun Microsystems, LINUX, UNIX, MAC OS X from Apple Computer Corporation, BeOS™, and the like. Many other configurations of a computer system are possible having more or fewer components than the computer system depicted in FIG. 1.

The present invention may also be embodied in a distributed network environment comprising one or more client and server computers. In such a network environment, processing and methods performed according to the teachings of the present invention may be distributed among one or more computer systems of the network environment.

Figure 2:
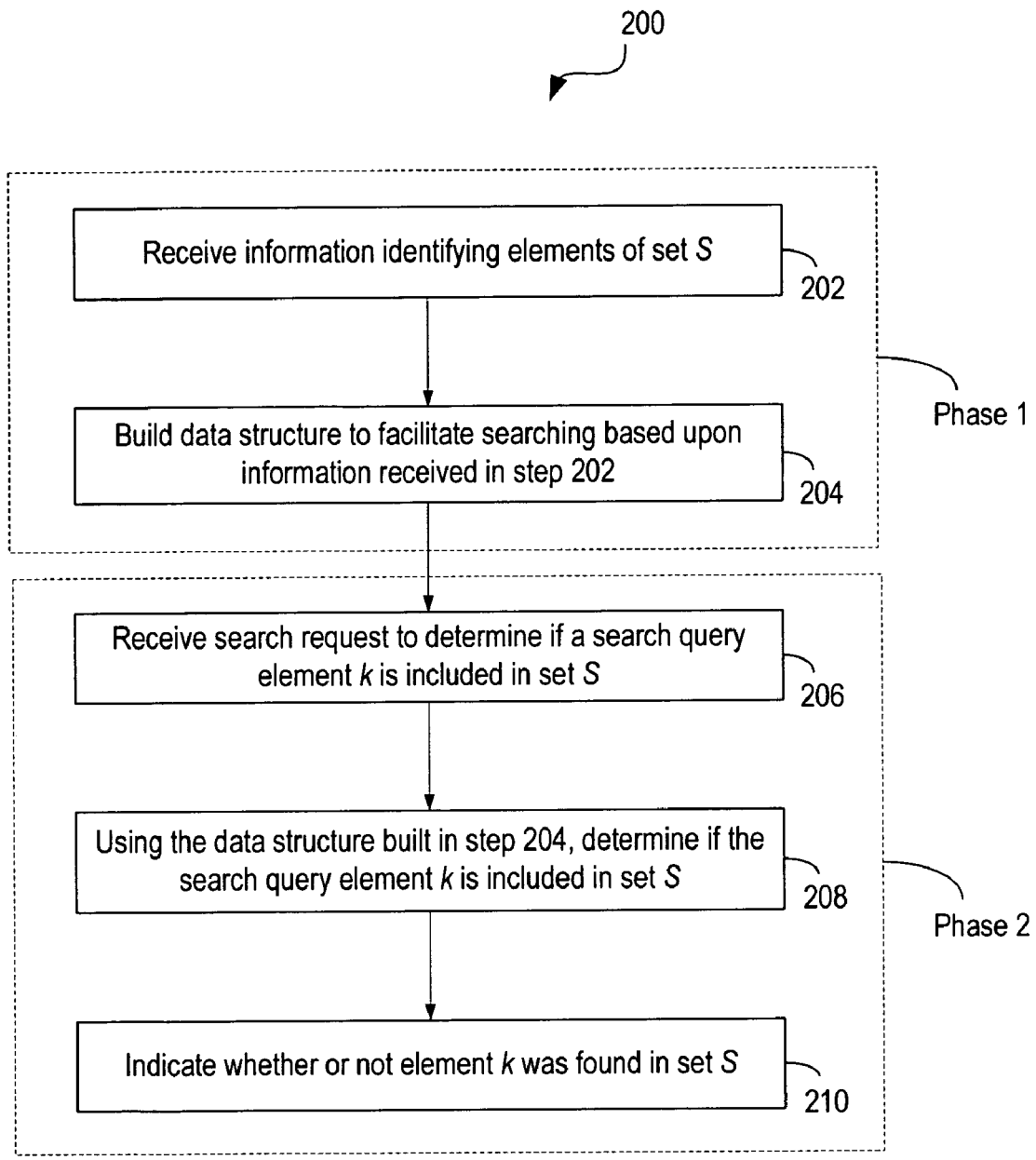
FIG. 2 is a high-level simplified flowchart of a method of performing searches according to an embodiment of the present invention.

FIG. 2 is a high-level simplified flowchart 200 of a method of performing searches according to an embodiment of the present invention. The method depicted in FIG. 2 may be performed by software modules executing on computer system 100, hardware modules coupled to computer system 100, or combinations thereof. Flowchart 200 depicted in FIG. 2 is merely illustrative of an embodiment incorporating the present invention and does not limit the scope of the invention as recited in the claims. One of ordinary skill in the art would recognize variations, modifications, and alternatives.

As shown in FIG. 2, the method comprises of two phases. During the first phase, a data structure or other like memory structure is generated to facilitate the searching operation that is performed in the second phase. The data structure generated during the first phase encapsulates information about elements included in the data set to be searched (i.e., the data structure is built based on elements contained in set S). According to an embodiment of the present invention, during the first phase, computer system 100 may receive information identifying the elements of set S (step 202). The elements themselves may be stored in the memory subsystem of computer system 100 or in some memory accessible to computer system 100. Based upon the information received in step 202, computer system 100 may then build a data structure (or any other memory storage structure) to facilitate searching which is performed in the second phase (step 204).

Various different kinds of data structures may be used to facilitate the searching operation. These include tables, databases, linked lists, trees, directed graphs, and the like. While in one embodiment the data structure is generated by computer system 100, in alternative embodiments of the present invention, the data structure encapsulating information related to the elements of set S may be built by another computer system and provided to computer system 100 (e.g., the data structure may be generated by another system or device and stored in memory accessible to computer system 100). Computer system 100 may then access the stored data structure in order to perform the searches according to the second phase.

After the data structure that stores information related to the elements of set S has been built according to the first phase, the present invention might then use the data structure to perform searches according to the teachings of the present invention. According to an embodiment of the present invention, during the second phase, computer system 100 may receive a search request to determine if a search query element "k" is included in set S (step 206). The search query might be specified by a user of computer system 100 using one or more input devices coupled to computer system 100. Alternatively, the search query may be configured and received from a process executing on computer system, from a device or system coupled to computer system 100 (e.g., a system coupled to computer system 100 via network interface 106), and/or from other systems or processes.

The data structure generated in step 204 is then used to determine if element k identified in the search request received in step 206 is included in set S (step 208). Computer system 100 may then output a signal indicating whether or not element k was found in set S (step 210). Alternatively, computer system 100 may be configured to perform one or more actions based on the results of step 208.

In accordance with the present invention, various different data structures may be built (during the first phase) to facilitate the search process. Further, various different search techniques may be used to determine if a particular query element k is included in set S based upon the information stored by the data structure built during the first phase. The following sections describe two search techniques that may be used to perform searches in an efficient manner while minimizing the memory resources required to perform the searches. In both of the search techniques described below, the number of comparisons needed to determine if a query element k in included in set S is proportional to the length of the query element (i.e., proportional to the number of characters contained in the query element).

First Search Technique

Figure 3:
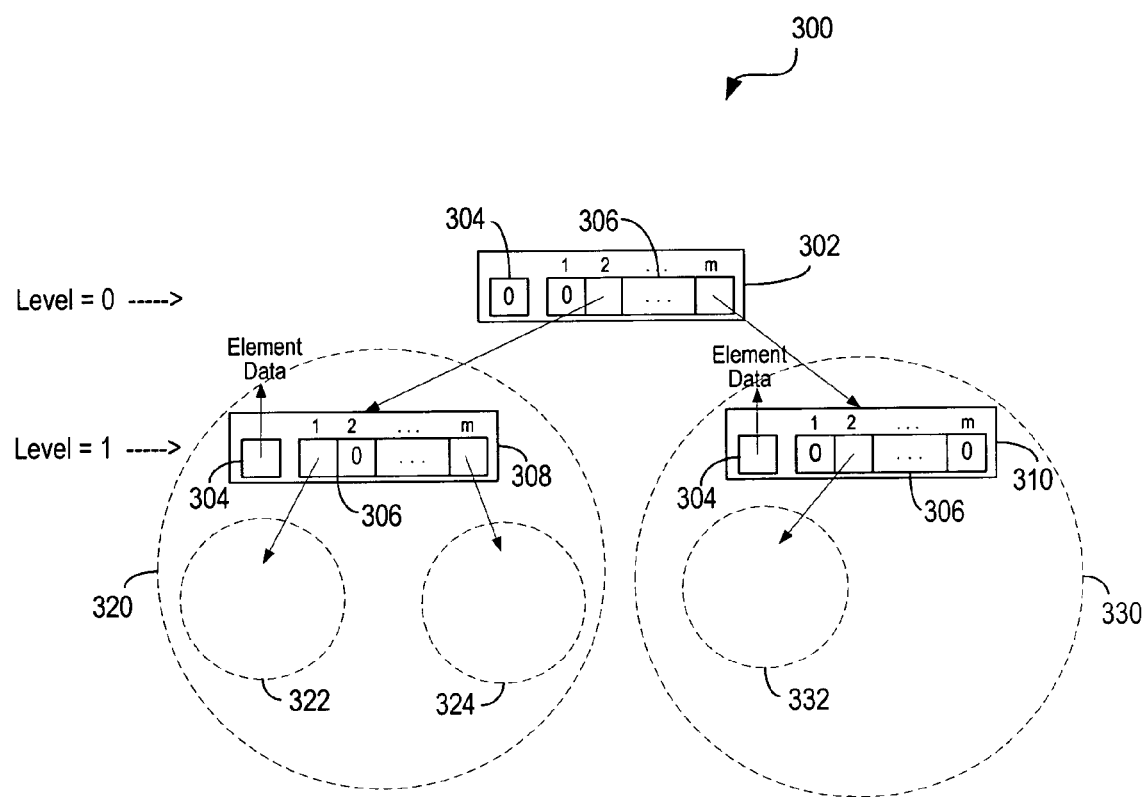
FIG. 3 depicts a portion of a tree data structure which may be built to facilitate the searching operation using the first search technique according to an embodiment of the present invention.

This section describes a first search technique which may be used to determine if a query element k is included in a set S. FIG. 3 depicts a portion of a tree data structure 300 which may be built (in step 204 of FIG. 2) to facilitate the searching operation using the first search technique according to an embodiment of the present invention. Data structure 300 depicted in FIG. 3 is merely illustrative of an embodiment incorporating the present invention and does not limit the scope of the invention as recited in the claims. One of ordinary skill in the art would recognize variations, modifications, and alternatives.

As shown in FIG. 3, tree data structure 300 comprises a plurality of nodes or memory structures 302, 308, 310, and the like. Each node of tree 300 comprises a plurality of memory locations including a first memory location 304 and an array of memory locations (referred to as Array[ ]) 306. According to an embodiment of the present invention, memory location 304 may store information related to an element of set S. For example, memory location 304 may store a pointer or reference to an element of set S, a pointer or reference to information associated with an element of set S, and the like. Alternatively, memory location 304 may store a null (or zero) value. Since memory location 304 stores or points to information related to an element of set S, memory location 304 will hereinafter be referred to as an "element pointer."

Memory locations in array 306 may store pointers or references to other nodes of data structure 300 or may alternatively be set to a null (or zero) value. According to an embodiment incorporating the first search technique, each memory location in array 306 corresponds to a character from the character set associated with arbitrary domain Σ. For example, if the character set for domain Σ comprises "m" characters, then array 306 comprises "m" memory locations (as depicted in FIG. 3), with each memory location corresponding to a particular character from the character set. Accordingly, as shown in FIG. 3, each node of tree 300 comprises an array Array[1:m] comprising "m" memory locations, where Array[1] corresponds to the first character in the character set for domain Σ, Array[2] corresponds to the second character in the character set for domain Σ, Array[3] corresponds to the third character in the character set for domain Σ, and so on. In general, Array[i] corresponds to a character in the $i^{th}$ position (sometimes referred to as the $i^{th}$ character of the character set of domain Σ) in the character set for domain Σ, for $1 \leq i \leq m$. For example, if the character set for domain Σ comprised of English alphabets (e.g., a, b, c, . . . , z), then m=26. In this embodiment, Array[1] corresponds to the character "a", Array[2] corresponds to the character "b", Array[3] corresponds to the character "c", Array[26] corresponds to the character "z", and so on.

In the embodiment depicted in FIG. 3, the various nodes are organized in the form of a tree structure headed by a root node 302. Tree 300 may comprise several levels, with each level comprising one or more nodes (except "Level 0" which comprises only one node, namely, root node 302). In general, a "Level" for a particular node indicates the number of nodes, starting with root node 302, which have to be traversed to reach the particular node. The root node (e.g., node 302 in FIG. 3) is at Level 0 since no nodes have to be traversed to reach the root node. Node 308 depicted in FIG. 3 is at Level 1, since the root node 302 has to be traversed to reach node 308. Likewise, node 310 is also at Level 1. Nodes coupled to nodes 308 and 310 are considered to be at Level 2, and so on.

According to an embodiment of the present invention applying the first search technique, each node at a particular level L stores information about an element in set S which has a length of at least (L+1) characters. In particular, in the embodiment depicted in FIG. 3, each node at a particular level L stores information about a character in the $(L+1)^{th}$ position (also referred to as the $(L+1)^{th}$ character of an element) of an element in set S having a length of at least (L+1) characters. The information is stored in array 306 of the nodes.

According to an embodiment of the present invention applying the first search technique, an array memory location Array[i] ($1 \leq i \leq m$) of a node at Level L of tree 300, is set to a non-null value and stores a pointer or reference pointing to another node of tree 300 at Level (L+1), if set S contains at least one element having a length of at least (L+1) characters and the element has the character corresponding to Array[i] (i.e., the $i^{th}$ character of the character set of domain Σ) in the $(L+1)^{th}$ position of the element. If memory location Array[i] is set for some i, the pointer Array[i] points to a sub-tree of one or more nodes that correspond to elements in set S that have the character corresponding to Array[i] in the $(L+1)^{th}$ position of the elements. Conversely, according to the teachings of the present invention, an array memory location Array[i] ($1 \leq i \leq m$) of a node at Level L of tree 300 is set to a null (or zero) value if set S does not contain any element that has the character corresponding to Array[i] in the $(L+1)^{th}$ position of the element.

Accordingly, array memory location Array[i] ($1 \leq i \leq m$) of root node 302 (at Level 0) of tree 300, is set to a non-null value and stores a pointer or reference pointing to another node of tree 300 at Level 1, if set S (for which data structure 300 has been built) contains at least one element that is at least 1 character long and that has the character corresponding to Array[i] in the first position of the element. For example, as depicted in FIG. 3, Array[2] of root node 302 stores a pointer to node 308 at Level 1 thereby indicating that set S contains at least one element that is at least 1 character long and that has the character corresponding to Array[2] in the first position of the element (or in other words, set S contains at least one element which starts with the second character of domain Σ). Array[2] of root node 302 points to a sub-tree 320 headed by node 308 comprising nodes that correspond to elements in set S that have the character corresponding to Array[2] in the first position of the elements.

Likewise, as depicted in FIG. 3, Array[m] of root node 302 stores a pointer to node 310 at Level 1 thereby indicating that set S contains at least one element that is at least 1 character long and that has the character corresponding to Array[m] in the first position of the element (or in other words, set S contains at least one element which starts with the $m^{th}$ character of domain Σ). Array[m] of root node 302 points to a sub-tree 330 headed by node 310 comprising nodes that correspond to elements in set S that have the character corresponding to Array[m] in the first position of the elements.

As depicted in FIG. 3, Array[1] of node 308 (at Level 1) stores a pointer to a node (not shown) at Level 2 thereby indicating that set S contains at least one element that is at least 2 characters long and that has the character corresponding to Array[2] in the first position of the element and the character corresponding to Array[1] in the second position of the element (or in other words, set S contains at least one element which has the second character of domain Σ in the first position of the element and has the first character of domain Σ in the second position of the element). Array[1] of node 308 points to a sub-tree 322 comprising nodes that correspond to elements in set S that have the character corresponding to Array[2] in the first position of the elements and the character corresponding to Array[1] in the second position of the elements.

As depicted in FIG. 3, Array[m] of node 308 (at Level 1) stores a pointer to a node (not shown) at Level 2 thereby indicating that set S contains at least one element that is at least two characters long and that has the character corresponding to Array[2] in the first position of the element and has the character corresponding to Array[m] in the second position of the element (or in other words, set S contains at least one element which has the second character of domain Σ in the first position of the element the $m^{th}$ character of domain Σ in the second position of the element). Array[m] of node 308 points to a sub-tree 324 comprising nodes that correspond to elements in set S that have the character corresponding to Array[2] in the first position of the elements and the character corresponding to Array[m] in the second position of the elements.

As depicted in FIG. 3, Array[2] of node 310 (at Level 1) stores a pointer to a node (not shown) at Level 2 thereby indicating that set S contains at least one element that is at least 2 characters long and that has the character corresponding to Array[m] in the first position of the element and has the character corresponding to Array[2] in the second position of the element (or in other words, set S contains at least one element which has the $m^{th}$ character of domain Σ in the first position of the element and the $2^{nd}$ character of domain Σ in the second position of the element). Array[2] of node 310 points to a sub-tree 332 comprising nodes that correspond to elements in set S that have the character corresponding to Array[m] in the first position of the elements and the character corresponding to Array[2] in the second position of the elements.

As depicted in FIG. 3, since Array[1] of root node 302 is set to NULL (indicated by a "0" in FIG. 3), it indicates that set S does not contain any element which has the character corresponding to Array[1] in the first position of the element (or in other words, set S does not contain any element which starts with the $1^{st}$ character of domain Σ). Likewise, Array[2] of node 308 is set to NULL thereby indicating that set S does not contain any element which has the character corresponding to Array[2] in the first position of the element and the character corresponding to Array[2] in the second position of the element. Likewise, Array[1] of node 310 is set to NULL thereby indicating that set S does not contain any element which has both the character corresponding to Array[m] in the first position of the element and the character corresponding to Array[1] in the second position of the element.

As a result of the manner in which data structure 300 is constructed, according to an embodiment of the present invention, the maximum level ($L_{max}$) of data structure 300 is equal to the length of the longest element in set S. As described above, a node in tree 300 at level "L," where $1 \leq L \leq L_{max}$, corresponds to an element in set S having at least L characters. Accordingly, presence of a node at a level L in tree 300 indicates that set S contains at least one element comprising at least L characters. Further, array memory location Array[i] of a node at a level L is non-NULL if set S contains at least one element which contains the $i^{th}$ character of domain Σ in the $(L+1)^{th}$ position in the element.

Memory location 304 (or element pointer 304) of a particular node at a level L is set if set S comprises at least one element which contains exactly L characters (i.e., length of the element is L) and which contains characters corresponding to array pointers of the various nodes which are traversed to reach the particular node starting from the root node, and the characters are in the positions indicated by the levels of the traversed nodes plus one. Memory location 304 may be set to a null value (represented by a zero in FIG. 3) if no such element exists in set S. Element pointer 304 of a node may point to the element itself or may alternatively point to information related or associated with the particular element. For example, in an access control application where each element corresponds to a resource, the element pointer corresponding to a particular element might point to a list of users who can access the resource. According to an embodiment using the first search technique, the element pointer of a root node is always set to a null value.

For example, as depicted in FIG. 3, element pointer 304 of node 308 is set to a non-null value and points to data related to an element of set S. This indicates that set S contains an element that has an exact length of (L+1)=0+1=1 character and the character is a character of domain Σ corresponding to Array[2] (i.e., the $2^{nd}$ character of the character set of domain Σ). Likewise, element pointer 304 of node 310 is set to a non-null value and points to data related to an element of set S, thereby indicating that set S contains an element that has an exact length of 1 character and the character is a character of domain Σ corresponding to Array[m] (i.e., the $m^{th}$ character of the character set of domain Σ).

Figure 4:
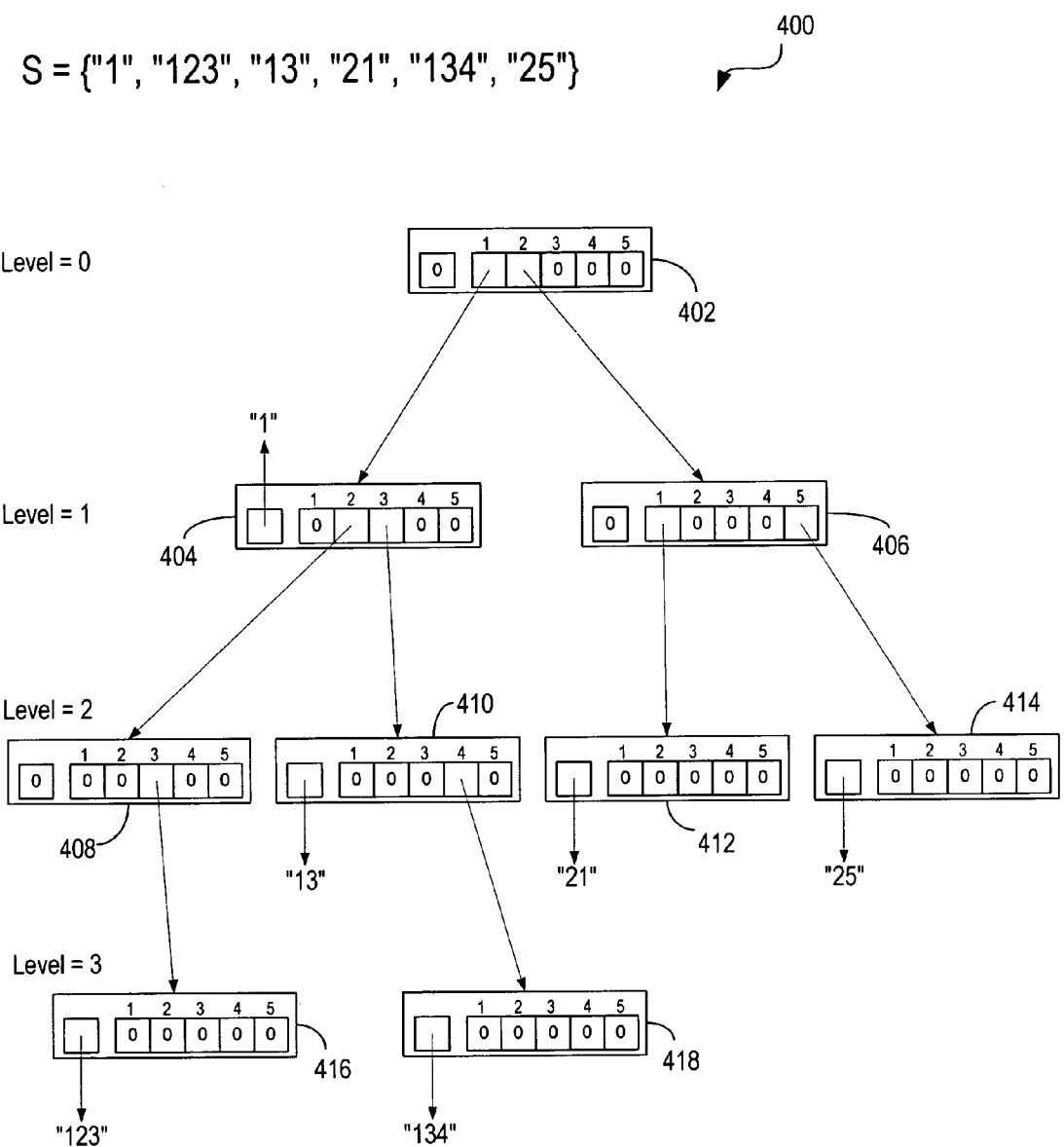
FIG. 4 depicts a tree data structure built according to an embodiment of the present invention applying the first search technique for a specific set S containing elements belonging to a domain $\Sigma$.

FIG. 4 depicts a tree data structure 400 built according to an embodiment of the present invention applying the first search technique for a specific set S containing elements belonging to a domain Σ. It is assumed that the character set for domain Σ comprises of five characters, namely "1", "2", "3", "4", and "5". Further, it is assumed that set S contains the following six elements S=("1", "123", "13", "134", "21", "25"). A tree data structure built based upon these assumptions is shown in FIG. 4.

As shown in FIG. 4, each node in tree 400 comprises an element pointer, and memory locations array Array[1:5]. Tree 400 has four levels (Level 0, Level 1, Level 2, and Level 3) with $L_{max}$=3 corresponding to the maximum length of the elements (element "123" and "134") in set S. For example, element "123" is represented by node 416 at Level 3 of tree 400. The element pointer of node 416 points to element "123" or to information associated with element "123". Similarly, the element pointer of node 404 points to element "1," the element pointer of node 410 points to element "13," the element pointer of node 418 points to element "134," the element pointer of node 412 points to element "21," and the element pointer of node 414 points to element "25."

Figure 5:
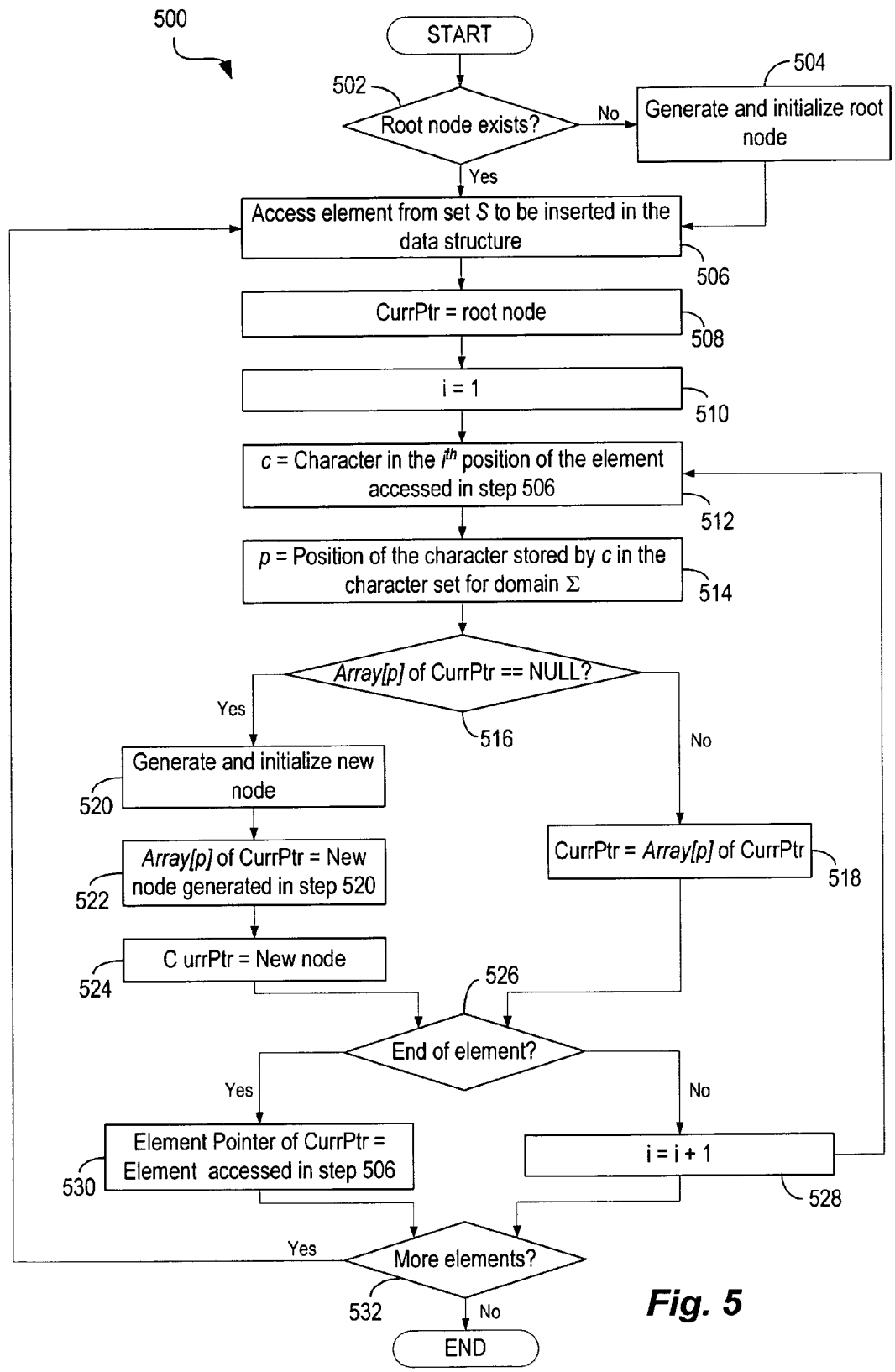
FIG. 5 is a high-level simplified flowchart of a method of building a data structure to facilitate searching according to an embodiment of the present invention applying the first search technique.

FIG. 5 is a high-level simplified flowchart 500 of a method of building a data structure to facilitate searching according to an embodiment of the present invention applying the first search technique. The method depicted in FIG. 5 may be performed by software modules executing on computer system 100, hardware modules coupled to computer system 100, or combinations thereof. Flowchart 500 depicted in FIG. 5 is merely illustrative of an embodiment incorporating the present invention and does not limit the scope of the invention as recited in the claims. One of ordinary skill in the art would recognize variations, modifications, and alternatives.

The processing is initiated by determining if a root node already exists for the data structure to be built (step 502). If a root node does not already exist, then a new root node is generated and initialized (step 504). As part of the node initialization process, all the memory locations, including the element pointer and the array of memory locations, are initialized to null (or zero) values.

An element (or information identifying the element) of set S to be inserted in the data structure is then accessed (step 506). The first element of set S (or information identifying the first element of set S) is accessed during the first pass of the flowchart depicted in FIG. 5. Other elements (or information identifying the other elements of set S) are accessed during subsequent passes until all the elements in set S have been processed.

A pointer variable "CurrPtr" is then instantiated (if it does not already exist) and initialized to point or refer to the root node (step 508). Pointer variable CurrPtr is used to traverse the data structure. A numeric variable "i" is then initialized to 1 (step 510). This variable is used to traverse the various characters of each element of set S to be inserted in the data structure. A character variable "c" is then initialized to the character in the $i^{th}$ position of the element accessed in step 506 (step 512). A numeric variable "p" is then initialized to the position of the character stored by variable c in the character set for domain $\Sigma$ (step 514). For example, if the character set was the set of English alphabets (e.g., a, b, c, . . . , z), then if variable c stored character "a" then variable p would be set to 1, if variable c stored character "f" then variable p would be set to 6, if variable c stored character "z" then variable p would be set to 26, and so on.

Memory location Array[p] of the node pointed to by CurrPtr is then checked to determine if it stores a null value (step 516). If Array[p] of the node pointed to by CurrPtr does not store a null value (i.e., stores a pointer to a node of the data structure), then CurrPtr is updated to point or refer to the node pointed to by Array[p] of the node currently pointed to by CurrPtr (step 518). Processing then continues with step 526 as described below.

If it is determined in step 516 that Array[p] of the node pointed to by CurrPtr stores a null value, then a new node is generated and initialized (step 520). As part of the node initialization process all the memory locations, including the element pointer and the array of memory locations, are initialized to null (or zero) values. Memory location Array[p] of the node pointed to by CurrPtr is then updated to store a reference or pointer to the new node created in step 520 (step 522). CurrPtr is also updated to point or refer to the node created in step 520 (step 524). Processing then continues with step 526.

A check is then made to determine if all the characters in the element accessed in step 506 has been processed (step 526). In other words, it is determined if the end of the element accessed in step 506 has been reached. If the end of the element has not been reached (i.e., the element still comprises one or more unprocessed characters), the value of numeric variable i is incremented by one (step 528). Processing then continues with step 512 wherein the next character of the element being processed is accessed. If the end of the element has been reached (i.e., all characters of the element have been processed), the element pointer of the node pointed to by CurrPtr is updated to point to the element accessed in step 506 (step 530). Alternatively, the element pointer may point to information associated with the element accessed in step 506.

A check is then made to determine if all the elements in set S have been processed (step 532). If all the elements of set S have not been processed, processing continues with step 506 wherein the next unprocessed element of set S is accessed. However, if it is determined that all the elements in set S have been processed, the process depicted in FIG. 5 comes to an end.

The data structure built according to the flowchart depicted in FIG. 5 can then be used to facilitate searching according to the first search technique. The data structure may be stored in a storage subsystem from where it can be accessed during the searching operation. According to the teachings of the present invention, the structure of the data structure is independent of the order in which elements are inserted and depends only on the length of the elements being inserted and the characters of the elements. The number of levels of the data structure depends on the length of the longest element in set S. In general, the number of levels of the data structure depends on the value of Z, (where "Z" is the maximum possible length of an element in domain $\Sigma$, and as a result, the maximum possible length of an element in set S). For example, if set S contains an element of length Z, then the data structure built according to the first search technique will have a total of (Z+1) levels with $L_{max}$=Z. The data structure is space efficient as no duplicate information is stored at any level.

The maximum size of the data structure is fixed, small, and is independent of the number of elements in set S. For a data structure generated according to the flowchart depicted in FIG. 5 (e.g., the data structures depicted in FIGS. 3 and 4), the memory used is Zm(m+1) for the bit array (Array[ ])pointers and 2Zm bytes for the element pointers (where "Z" is the maximum possible length of an element in domain $\Sigma$, and "m" is the number of characters in the character set for domain $\Sigma$). As an example, if the maximum length of an element in domain $\Sigma$ is 255 (e.g., if the domain $\Sigma$ corresponds to strings in a computer-based file system), and the size of the character set is 91 (e.g., alphanumeric characters), then the memory needed for the data structure is approximately 300 KB. Given the efficient representation of the data structure, it can be cached at multiple locations (e.g., at a web server, at a proxy server, and the like) for efficient processing of search requests.

Figure 6:
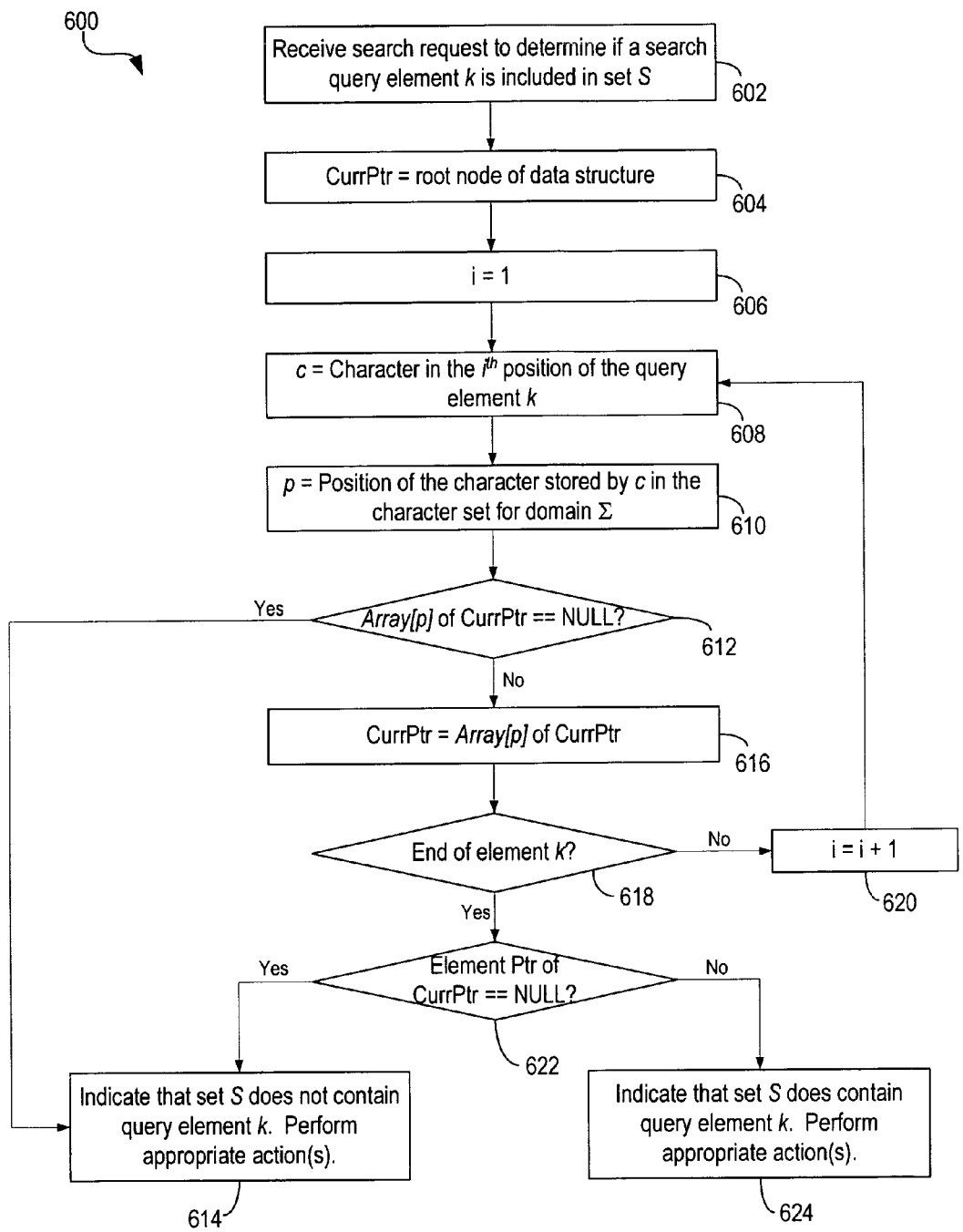
FIG. 6 is a high-level simplified flowchart of a method of determining if set S contains a search query element k according to an embodiment of the present invention applying the first search technique.

FIG. 6 is a high-level simplified flowchart 600 of a method of determining if set S contains a search query element k according to an embodiment of the present invention applying the first search technique. The method depicted in FIG. 6 may be performed by software modules executing on computer system 100, hardware modules coupled to computer system 100, or combinations thereof. Flowchart 600 depicted in FIG. 6 is merely illustrative of an embodiment incorporating the present invention and does not limit the scope of the invention as recited in the claims. One of ordinary skill in the art would recognize variations, modifications, and alternatives.

As shown in FIG. 6, processing may be initiated when computer system 100 receives a search request to determine if set S contains a search query element k (step 602). As previously described, the search request might be specified by a user of computer system 100 using one or more input devices coupled to computer system 100. Alternatively, the search query may also be configured and received from a process executing on computer system 100, from a device or system coupled to computer system 100 (e.g., a system coupled to computer system 100 via network interface 106), and/or from other systems or processes.

Computer system 100 then initializes variables to be used for the processing. A pointer variable "CurrPtr" is then instantiated (if it does not already exist) and initialized to point or refer to the root node of a data structure built for set S (built according to FIG. 5) and to be used for the search (step 604). The data structure may be accessed from a memory accessible to computer system 100 that performs the search. Pointer variable CurrPtr is used to traverse the data structure. A numeric counter variable "i" is then initialized to 1 (step 606). This variable is used to traverse the various characters of query element k. A character variable "c" is then initialized to the character in the $i^{th}$ position of query element k (step 608). During the first pass of the flowchart, variable c is initialized to the first character of element k. A numeric variable "p" is then initialized to the position of the character stored by variable c in the character set for domain Σ (step 610). For example, if the character set was the set of English alphabets (e.g., a, b, c, ..., z), then if variable c stored character "a" then variable p would be set to 1, if variable c stored character "f" then variable p would be set to 6, if variable c stored character "z" then variable p would be set to 26, and so on.

Memory location Array[p] of the node pointed to by CurrPtr is then checked to determine if it stores a null value (step 612). If Array[p] of the node pointed to by CurrPtr stores a null value, it indicates that set S does not contain element k. A signal may then be output to the source of the search request indicating that set S does not contain query element k (step 614). Other appropriate actions may also be performed in step 614.

If it is determined in step 612 that Array[p] of the node pointed to by CurrPtr stores a non-null value (i.e., stores a pointer or reference to another node in the data structure), then CurrPtr is updated to point or refer to the node pointed to by Array[p] of the node currently pointed to by CurrPtr (step 616). The present invention then checks if all the characters in query element k have been processed (step 618). In other words, the present invention determines if the end of query element k has been reached. If the end of query element k has not been reached (i.e., query element k still comprises one or more unprocessed characters), the value of numeric variable i is incremented by one (step 620). Processing then continues with step 608 wherein the next character of query element k is accessed.

If it is determined in step 618 that the end of query element k has been reached (i.e., all characters of query element k have been processed), the element pointer of the node pointed to by CurrPtr is checked to see if it stores a non-null value (step 622). Alternatively, the element pointer of the node pointed to by CurrPtr is checked to see if it points to an element k or points to information relevant to element k. If the element pointer stores a null value, it indicates that set S does not contain element k and processing continues with step 614.

If, however, it is determined in step 622 that the element pointer of the node pointed to by CurrPtr stores a non-null value (may point to the element itself or information associated with the element), it indicates that set S includes query element k. A signal may then be output to the source of the search request indicating that set S contains query element k (step 624). Other appropriate actions, which may use the information pointed to by the element pointer, may also be performed in step 624.

As described above, the method depicted in FIG. 6 may be used to search for a query element according to an embodiment of the present invention applying the first search technique. For example, the method depicted in FIG. 6 may be applied to search for a query element "234" in tree 400 depicted in FIG. 4. At the start of the processing, the query request may be received in step 602 requesting a search to determine if element "234" is in set S={"1", "123", "21", "13", "134", "21", "25"}. Per step 604, CurrPtr is initialized to root node 402. Variable i is set to 1 (per step 606). Variable c is initialized to "2" which is the first character of query element "234". Variable p is initialized to 2 (the position of character "2" in character set for domain Σ). The present invention then checks if Array[2] of node 402 is NULL. Since Array[2] of node 402 is not NULL (as shown in FIG. 4), CurrPtr is set to point to node 406 (i.e., the node pointed to by Array[2] of node 402) per step 616. A check is then made to see if the end of element "234" has been reached (per step 618). Since the end has not been reached, and the value of variable i is incremented by 1 to 2 and processing continues with step 608 wherein variable c is set to "3" which is the second character of query element "234". Variable p is initialized to 3 (the position of character "3" in character set for domain Σ). The present invention then checks if Array[3] of node 406 is NULL. Since Array[2] of node 402 is NULL (as shown in FIG. 4), it indicates that string "234" is not included in set S. A signal may then be output to the source of the search request indicating that set S does not contain query element "234" (per step 614). As described above, only two character comparisons (checking the values of bit array Array[ ]) are required to determine whether or not element "234" is included in set S.

As another example, consider that the search query element is "12" which may be received in a search query in step 602. Per step 604, CurrPtr is initialized to root node 402. Variable i is set to 1 (per step 606). Variable c is initialized to "1" which is the first character of query element "12". Variable p is initialized to 1 (the position of character "1" in character set for domain Σ). The present invention then checks if Array[1] of node 402 is NULL. Since Array[1] of node 402 is not NULL (as shown in FIG. 4), CurrPtr is set to point to node 404 (i.e., the node pointed to by Array[1] of node 402) per step 616. A check is then made to see if the end of element "12" has been reached (per step 618). Since the end has not been reached, and the value of variable i is incremented by 1 to 2 and processing reverts back to step 608 whereby variable c is set to "2" which is the second character of query element "12". Variable p is initialized to 2 (the position of character "2" in character set for domain Σ). The present invention then checks if Array[2] of node 404 is NULL. Since Array[2] of node 404 is not NULL (as shown in FIG. 4), CurrPtr is set to point to node 408 (i.e., the node pointed to by Array[2] of node 404) per step 616. A check is then made to see if the end of element "12" has been reached (per step 618). Since the end has been reached, the present invention checks if the element pointer of node 408 is set to a null value (per step 622). Since the element pointer of node 408 is set to NULL (as shown in FIG. 4), it indicates that string "12" is not included in set S. A signal may then be output to the source of the search request indicating that set S does not contain query element "12" (per step 614). As described above, only two character comparisons are needed to determine whether or not element "12" is included in set S.

As a third example, let assume that the search query element is "134". As described in flowchart 600, processing starts with root node 402. Array pointers of the root node and subsequent nodes are then traversed to determine if the query element is in set S. For example, for element query "134", Array[1] of root node 402 is traversed to get to node 404. Then, Array[3] of node 404 is traversed to get to node 410. Then, Array[4] of node 410 is traversed to get to node 418. The present invention then checks if the element pointer of node 418 is set to NULL (per step 622). Since the element pointer of node 418 is not set to NULL, it indicates that element "134" is included in set S. A signal may be output to the source of the search request indicating that set S contains query element "134" (per step 624). The present invention may then perform appropriate actions. As described above, only three character comparisons are required to determine whether or not element "134" is included in set S.

In general, according to the first search technique, if there are "$k_{length}$" characters in a given search query element k, then by applying the method depicted in FIG. 6, it takes at most "$k_{length}$" character comparisons to determine if k is included in set S. In the worst case scenario, $k_{length}$ is equal to Z (where "Z" is the maximum possible length of an element in domain Σ). Accordingly, at most one element comparison is needed. The number of comparisons needed to perform the search is thus proportional to the length of the query element. Thus, the first search technique described above is optimized with respect to the number of comparisons required to determine if a particular search query element is in a particular data set. The first search technique is highly optimized for in-memory searches. The number of comparisons is not dependent on the size of set S. If a given query element is not present in the data structure (i.e., not a member of set S), then only a few bit comparisons (of array pointers) are needed to determine that the element is not in set S. This is in contrast to conventional search techniques that may require multiple element comparisons.

The data structure built according to the teachings of the first search technique can also be used for prefix matching of elements. Prefix matching refers to the process of finding all strings that begin with a given (or user-specified) query substring. For example, if set S comprises strings representing URIs, the user may wish to determine all URIs that begin with "http://www.arcot." (which represents the query). This may be performed using the data structure built according to the first technique. In the manner described above, based upon characters included in the query, the data structure, starting with the root node, is traversed to arrive at a particular node at a particular level "L". All the sub-trees rooted at the particular node represent elements in set S that begin with "http://www.arcot." (or any other query string). For example, as depicted in FIG. 3, sub-tree 322 corresponds to elements in set S that have the character corresponding to Array[2] in the first position of the elements and the character corresponding to Array[1] in the second position of the elements. Likewise, sub-tree 324 correspond to elements in set S that have the character corresponding to Array[2] in the first position of the elements and the character corresponding to Array[m] in the second position of the elements. Sub-tree 332 corresponds to elements in set S that have the character corresponding to Array[m] in the first position of the elements and the character corresponding to Array[2] in the second position of the elements. The data structure built according to the first technique thus facilitates prefix matching.

The first search technique also facilitates the operations of inserting elements in the tree data structure (referred to as the "insert" operation) and deleting elements from the tree data structure (referred to as the "delete" operation). An "insert" operation may be needed when a new element is added to set S while a "delete" operation may be needed when an element is removed from set S.

The "insert" operation may be accomplished in the following manner according to an embodiment of the present invention. Lets assume that a new element "R" is to be inserted in set S, where $R = c_1 c_2 \ldots c_q$ for some $q \leq Z$ (where "Z" is the maximum possible length of an element in domain Σ), and $c_i \in \Sigma, 1 \leq i \leq q$. The insertion operation can be performed using the flowchart depicted in FIG. 5 (step 532 is not required if only one element is to be inserted). For example, starting with the root node of the tree, the data structure tree is traversed using array pointers Array[$c_1$], Array[$c_2$], Array[$c_3$], . . . , Array[$c_q$] to get to a particular node whose element pointer is then pointed to the new element "R" or to information corresponding to new element "R." One or more new intermediate nodes may need to be created to accomplish the insertion.

The "delete" operation may be accomplished in the following manner according to an embodiment of the present invention. Lets assume that the element "R" (inserted above) is to be now deleted from set S. In order to delete the element from the tree data structure, starting with the root node of the tree, array pointers Array[$c_1$], Array[$c_2$], Array[$c_3$], . . . , Array[$c_q$] are traversed to get to particular node whose element pointer points to the element to be deleted. The element point is then set to NULL to complete deletion of element "R" from set S.

In accordance with embodiments of the present invention applying the first search technique, the "insert" and "delete" operations take O($R_{length}$) time where "$R_{length}$" is the length of the element to be inserted or deleted (i.e., $R_{length} = |R|$). Further, the insert and delete operations can be performed in parallel.

Accordingly, using a data structure such as the tree data structure described above, the "Search", "Insert", and "Delete" operations can be performed in a time proportional to the number of characters in the query element or the element to be inserted or deleted. In particular, if the given query element k consists of "$k_{length}$" characters, then the operations can be performed using at most "$k_{length}$" character comparisons.

The first search technique described above may also be used in situations where set S contains multiple copies of an element (e.g., duplicates, triplicates, etc.). In this scenario, the element pointer of a node corresponding to an element having multiple copies may point or refer to a linked list of structures corresponding to the multiple copies of the element. The memory used by the above data structure is O(D) nodes where D is the total number of characters in all the elements of set S, i.e.

$$D = \sum_{s \in S} |s|.$$

Thus the memory used is O(Dm) bytes. This memory bound can be further reduced using techniques described below.

In order to reduce the memory requirement, a tree data structure may be used wherein the array of pointers Array[ ] for each node of the tree is replaced with a balanced tree (such as a 2-3 tree, a red-black tree, etc.). In the "array of pointers" tree case, the memory needed for each node of the tree was m. On the other hand the memory needed for each node in the revised version aimed at saving memory is only O(q) where q is the number of non-NULL pointers in that node. Thus the memory needed for the entire tree is only O(D) bytes.

Also, in the previous case, obtaining any pointer of a node can be done in O(1) time. In the modified "memory saver" version, each pointer access will cost O(log q) time where q is the number of non-NULL pointers in that node. Accordingly, based upon the above, according to an embodiment of the present invention, a dictionary can be implemented in such a way that each operation takes O(H log m) time where "H" is the number of characters in the search query element and m=|Σ|. The memory needed according to this embodiment of the present invention is only O(D) bytes where $$D = \sum_{s \in S} |s|.$$

A typical value of (log m) is 5 or 6. Thus, the "memory saver" technique has a (worst case) performance that is very competitive with the average case performance of conventional search techniques.

Second Search Technique

This section describes a second search technique for performing searches in an efficient manner while minimizing the memory resources required to perform the searches. As with the first search technique described above, the second search technique described below can be used to determine if a search query element k from an arbitrary domain $\Sigma$ (i.e., $k \in \Sigma$) is a member of a set S (i.e., if $k \in \Sigma$) comprising "n" elements "$k_1, k_2, \ldots k_n$" (i.e., $X=(k_1, k_2, \ldots, k_n)$) from domain $\Sigma$. Each element in domain $\Sigma$ (and subsequently each element in set S) may comprise one or more characters from a specified character set of domain $\Sigma$.

The second search technique may be embodied in a computer system such as computer system 100 depicted in FIG. 1. It should be apparent that FIG. 1 is merely illustrative of an embodiment incorporating the present invention and does not limit the scope of the invention as recited in the claims. One of ordinary skill in the art would recognize other variations, modifications, and alternatives.

As described above, processing for the second search technique comprises two phases as shown in FIG. 2. During the first phase, a data structure or other like memory structure is generated to facilitate the search operation that is performed in the second phase. The data structure generated during the first phase is based upon elements included in the data set to be searched (i.e., the data structure is built based on the elements in set S). According to an embodiment of the present invention implementing the second search technique, during the first phase, computer system 100 may receive information identifying the elements of set S (step 202). The elements themselves may be stored in the memory subsystem of computer system 100 or in some memory accessible to computer system 100. Based upon the information received in step 202, computer system 100 may then build a data structure (or any other memory storage structure) to facilitate searching which is performed in the second phase (step 204).

Various different kinds of data structures may be used to facilitate the searching operation. Although a specific data structure has been described below, the scope of the second search technique is not restricted to that data structure. While in one embodiment the data structure is generated by computer system 100, in alternative embodiments of the present invention, the data structure encapsulating information related to the elements of set S may be built by another computer system and provided to computer system 100 (e.g., the data structure may be generated by another system or device and stored in memory accessible to computer system 100). Computer system 100 may then access the stored data structure in order to perform the searches according to the second search technique.

After the data structure storing information related to the elements of set S has been built according to the first phase, the data structure is then used to facilitate searches, using the second search technique, which are performed in the second phase. According to an embodiment of the present invention, during the second phase, computer system 100 may then receive a search request to determine if a search query element "k" is included in set S (step 206). The search query might be specified by a user of computer system 100 using one or more input devices coupled to computer system 100. Alternatively, the search query may also be configured and received from a process executing on computer system, from a device or system coupled to computer system 100 (e.g., a system coupled to computer system 100 via network interface 106), and/or from other systems or processes.

According to the second search technique, the data structure generated in step 204 is then used to determine if element k identified in the search request received in step 206 is included in set S (step 208). Computer system 100 may then output a signal indicating whether or not element k was found in set S (step 210). Computer system 100 may also be configured to perform one or more actions based on the results of step 208.

Figure 7:
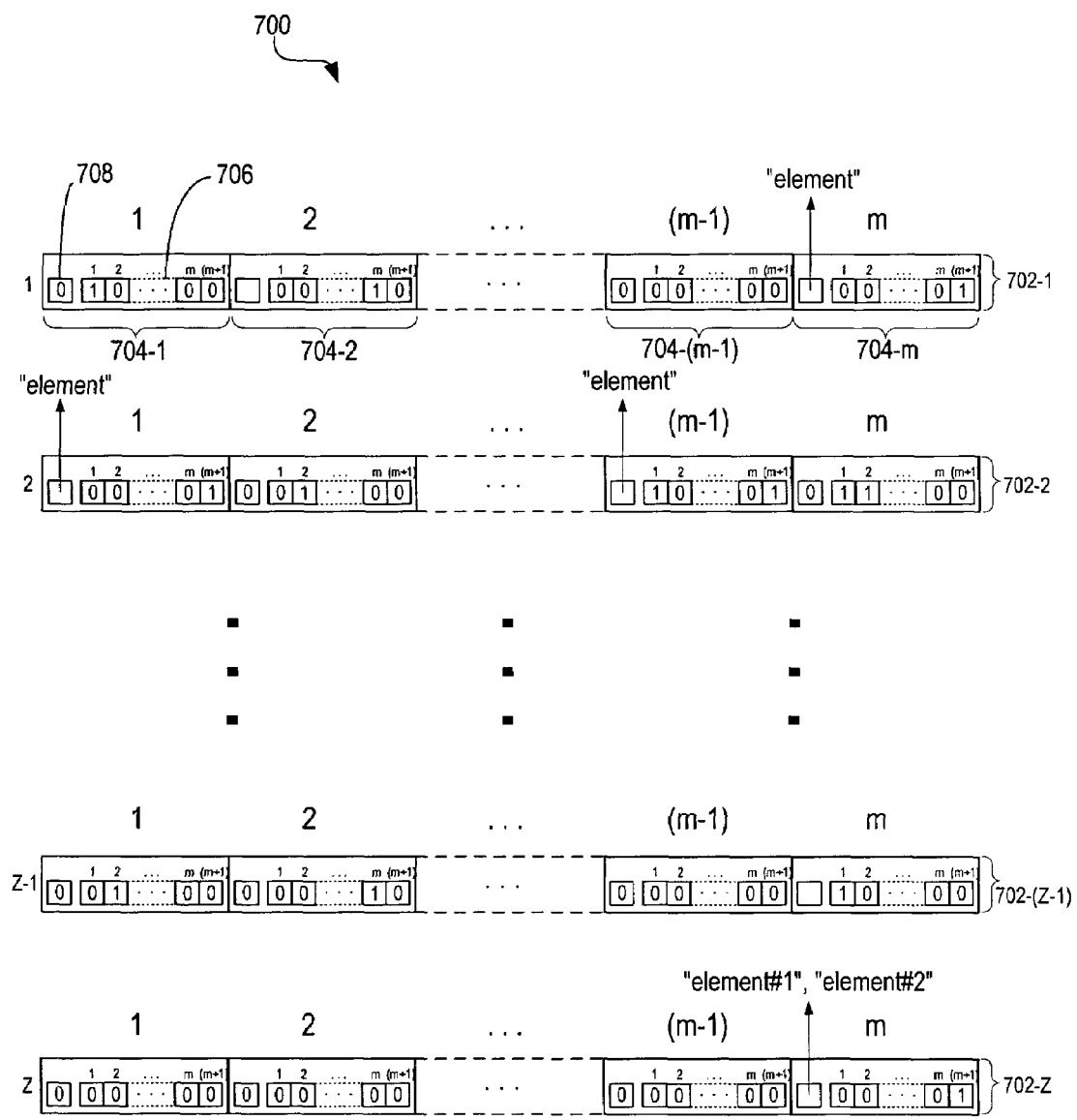
FIG. 7 depicts a data structure which may be built to facilitate search operations according to an embodiment of the present invention applying the second search technique.

FIG. 7 depicts a data structure 700 which may be built (in step 204 of FIG. 2) to facilitate search operations according to an embodiment of the present invention applying the second search technique. Data structure 700 depicted in FIG. 7 is merely illustrative of an embodiment incorporating the present invention and does not limit the scope of the invention as recited in the claims. One of ordinary skill in the art would recognize variations, modifications, and alternatives.

As shown in FIG. 7, data structure 700 comprises Z nodes or memory structures (702-1 through 702-Z), where Z is the maximum possible length of an element in domain $\Sigma$. Each node 702 corresponds to a character in a particular position in an element of set S. For example, the first node 702-1 corresponds to a character in the first position of an element, the second node 702-2 corresponds to a character in the second position of an element, the third node 702-3 corresponds to a character in the third position of an element, and so on. Accordingly, the $Z^{th}$ node 702-Z corresponds to a character in the $Z^{th}$ position of an element.

Each node 702 comprises m slots (704-1 through 704-m), where m is the number of characters in the character set for domain $\Sigma$. Each slot 704 corresponds to a character in the character set of domain $\Sigma$. For example, the first slot 704-1 corresponds to the first character in the character set of domain $\Sigma$, the second slot 704-2 corresponds to the second character in the character set of domain $\Sigma$, the third slot 704-3 corresponds to the third character in the character set of domain $\Sigma$, and so on. For example, if the character set for domain $\Sigma$ comprised of English alphabets (e.g., a, b, c, . . . , z), then m=26. In this embodiment, each node would comprise 26 slots wherein the first slot 704-1 corresponds to the character "a", the second slot 704-2 corresponds to the character "b", the third slot 704-3 corresponds to the character "c", and so on.

In the embodiment depicted in FIG. 7, each slot 704 in turn comprises a bit-array 706 (referred to as Array[ ]) comprising (m+1) bit locations, where m is the number of characters in the character set for domain $\Sigma$. The first m bits of each bit-array Array[ ] 706 correspond to characters in the character set of domain $\Sigma$. For example, Array[1] corresponds to the first character in the character set of domain $\Sigma$, Array[2] corresponds to the second character in the character set of domain $\Sigma$, Array[3] corresponds to the third character in the character set of domain $\Sigma$, and so on. For example, if the character set for domain $\Sigma$ comprised of English alphabets (e.g., a, b, c, . . . , z), then m=26. In this embodiment, bit-array Array[ ] would comprise 27 bits wherein Array[1] corresponds to the character "a", Array[2] corresponds to the character "b", Array[3] corresponds to the character "c", and so on. The last bit of each bit array, namely Array[m+1], is used to denote the end of an element.

According to an embodiment of the present invention, each slot of each node also comprises a memory location 708 that may store information related to an element or elements of set S. Memory location 708 may store a pointer or reference to a table or other memory structure storing information for an element(s) of set S. Alternatively memory location 708 may store a null (or zero) value. Since memory location 708 stores or points to information related to one or more elements of set S, memory location 708 will hereinafter be referred to as an "element pointer" of a slot in a particular node.

The following notation will be used for purposes of describing the second search technique. The data structure depicted in FIG. 7 will be denoted by DS[1:Z][1:m]. In particular, DS[x][y] will refer to the $y^{th}$ slot (i.e., the slot corresponding to $y^{th}$ character of domain Σ) in the $x^{th}$ node of data structure 700.

In order to build the data structure, all the bit-arrays for all the slots for all the nodes in data structure 700 are initialized to null (or zero) values. In order to insert an element R from set S, where $R=c_1 c_2 \ldots c_q$ for some $q \leq Z$ (where "Z" is the maximum possible length of an element in domain Σ), and $c_i \in \Sigma, 1 \leq i \leq q$, the bit in Array[Position of $c_2$ in the character set] (i.e., the bit corresponding to character $c_2$) of slot DS[1][Slot corresponding to $c_1$] is set to a non-null value (e.g., set to 1), the bit in Array[Position of $c_3$ in the character set] (i.e., the bit corresponding to character $c_3$) of slot DS[2][Slot corresponding to $c_2$] is set to a non-null value, ..., the bit in Array[Position of $c_q$ in the character set] (i.e., the bit corresponding to character $c_q$) of slot DS[q−1][Slot corresponding to $c_{q-1}$] is set to a non-null value, and the bit in Array[m+1] of slot DS[q][Slot corresponding to $c_q$] is set to a non-null value. The element pointer of slot DS[q][Slot corresponding to $c_q$] is updated to point or refer to information relevant to element R.

Figure 8:
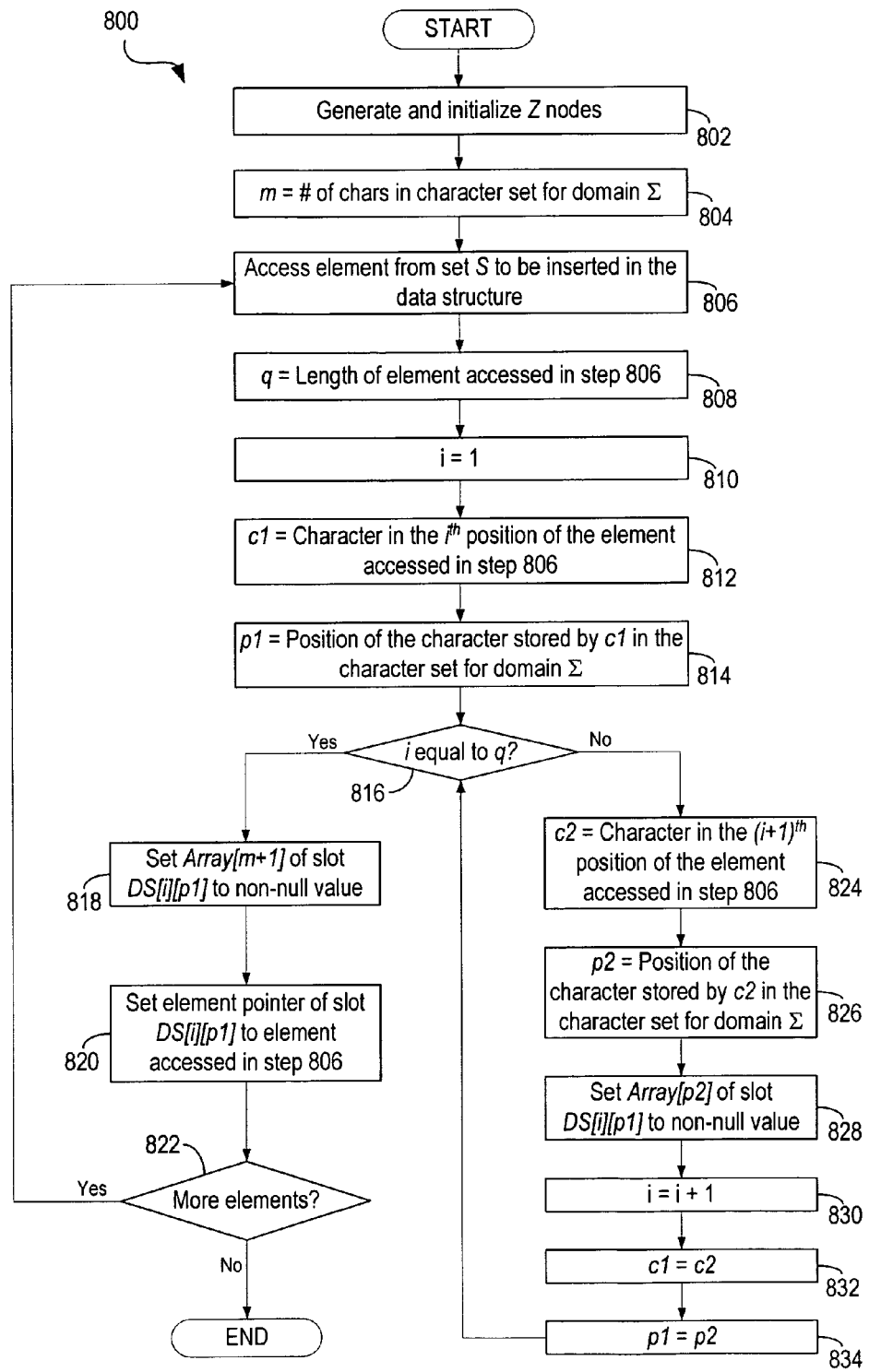
FIG. 8 is a high-level simplified flowchart of a method of building a data structure to facilitate searching according to an embodiment of the present invention applying the second search technique.

FIG. 8 is a high-level simplified flowchart 800 of a method of building a data structure to facilitate searching according to an embodiment of the present invention applying the second search technique. The method depicted in FIG. 8 may be performed by software modules executing on computer system 100, hardware modules coupled to computer system 100, or combinations thereof. Flowchart 800 depicted in FIG. 8 is merely illustrative of an embodiment incorporating the present invention and does not limit the scope of the invention as recited in the claims. One of ordinary skill in the art would recognize variations, modifications, and alternatives.

The processing is initiated by generating Z nodes (where Z is the maximum length of an element in domain Σ) comprising m slots (where m is the number of characters in the character set for domain Σ), wherein each slot comprises a bit-array Array[ ] comprising [m+1] memory locations and an element pointer (step 802). As part of step 802, the bit array locations and the element pointers are all initialized to null (or zero) values.

A numeric variable "m" is set to the number of characters in the character set for domain Σ (step 804). An element (or information identifying the element) in set S to be inserted into the data structure is then accessed (step 806). The first element of set S is accessed during the first pass of the flowchart depicted in FIG. 8. Other elements (or information identifying the other elements) are accessed during subsequent passes until all the elements in set S have been processed.

A numeric variable "q" is then initialized to the length of the element (i.e., the number of characters in the element) accessed in step 806 (step 808). A counter variable "i" is then initialized to 1 (step 810). This variable is used to traverse the various characters of the element to be inserted into the data structure. A character variable "c1" is then initialized to the character in the $i^{th}$ position of the element accessed in step 806 (step 812). A numeric variable "p1" is then initialized to the position of the character stored by variable c1 in the character set for domain Σ (step 814). For example, if the character set was the set of English alphabets, then if variable c1 stored character "a" then variable p1 would be set to 1, if variable c1 stored character "f" then variable p1 would be set to 6, if variable c1 stored character "z" then variable p1 would be set to 26, and so on.

A check is then made to determine if the value stored by variable i is equal to the value of q (step 816). This is done to determine if the end of the element (i.e., the last character in the element) accessed in step 806 has been reached. If it is determined in step 816 that i is equal to q (i.e., the end of the element has been reached), then array-bit Array[m+1] of slot DS[i][p1] is set to a non-null value (step 818). The element pointer of slot DS[i][p1] is set to point or refer to the element accessed in step 806 or information relevant to the element accessed in step 806 (step 820). The present invention then checks if all the elements in set S have been processed (step 822). If all the elements of set S have not been processed, processing continues with step 806 wherein the next unprocessed element of set S is accessed. However, if it is determined that all the elements in set S have been processed, then the process depicted in FIG. 8 comes to an end.

If it is determined in step 816 that i is not equal to q (i.e., the end of the element accessed in step 806 has not been reached), then a character variable "c2" is set to the character in the $(i+1)^{th}$ position of the element accessed in step 806 (step 824). A numeric variable "p2" is then set to the position of the character stored by variable c2 in the character set for domain Σ (step 826). Array-bit Array[p2] of slot DS[i][p1] is then set to a non-null value (step 828). The value of variable i is then incremented by one (step 830). Variable c1 is then set to the character stored by variable c2 (step 832). Variable p1 is set to the value of variable p2 (step 834). Processing then continues with step 816 as described above.

The data structure built according to the flowchart depicted in FIG. 8 can then be used to facilitate searching by applying the second search technique. The data structure may be stored in a storage subsystem from where it can be accessed during the searching operation. According to the teachings of the present invention, the data structure built according to the flowchart depicted in FIG. 8 is independent of the order in which the elements are inserted and depends only on the elements to be inserted, the number of characters in the character set for domain Σ ("m"), and the maximum possible length of an element in domain Σ ("Z"). The data structure is space efficient as no duplicate information is stored in any of the nodes.

The maximum size of the data structure is fixed, small, and independent of the number of elements in set S. For a data structure depicted in FIG. 7, the memory used is Zm(m+1) for the bit array pointers and 2Zm bytes for the element pointers (where "Z" is the maximum possible length of an element in domain Σ, and "m" is the number of characters in the character set for domain Σ). As an example, if the maximum length of an element in domain Σ is 255 (e.g., if the domain Σ corresponds to strings in a computer-based file system), and the size of the character set is 91, then the memory needed for the data structure is approximately 300 KB. Given the efficient representation of the data structure, it can be cached at multiple locations (e.g., at a web server, at a proxy server, and the like) for efficient processing of search requests.

Figure 9:
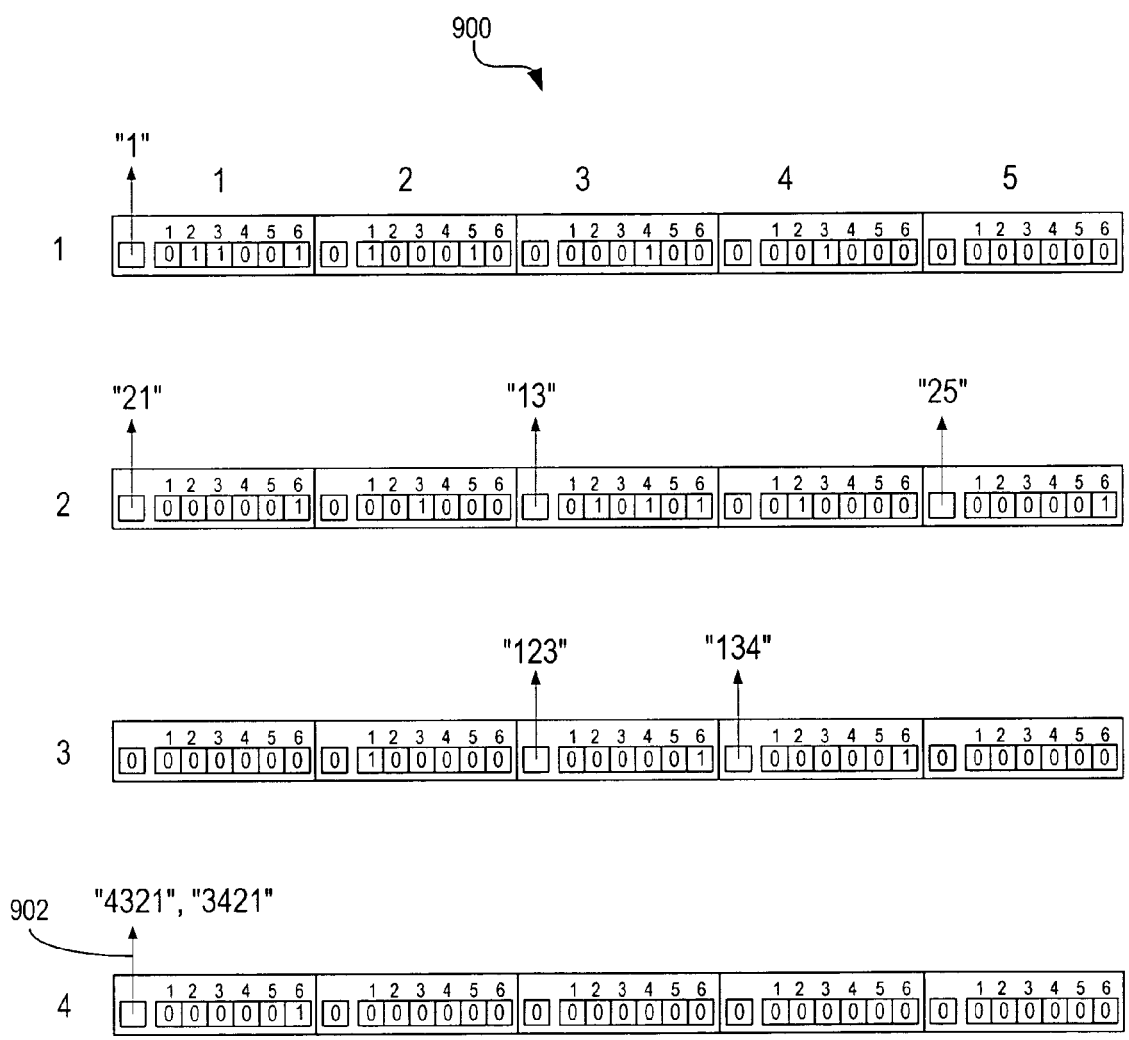
FIG. 9 depicts a data structure built according to the teachings of the second search technique for a specific set S containing elements belonging to a domain $\Sigma$ according to an embodiment of the present invention.

FIG. 9 depicts a data structure 900 built according to the teachings of the second search technique for a specific set S containing elements belonging to a domain Σ according to an embodiment of the present invention. For the embodiment depicted in FIG. 9 it is assumed that the character set for domain Σ comprises of five characters, namely "1", "2", "3", "4", and "5", and that the maximum length of an element in domain Σ is 4. Further, it is assumed that set S contains the following six elements S=("1", "123", "13", "21", "134", "4321", "25", "3421").

As shown in FIG. 9, elements that have the same length and which have the same last character map to the same element pointer. For example, as shown in FIG. 9, elements "4321" and "3421" map to the same element pointer 902. According to an embodiment of the present invention, the elements may be stored in a table, linked list, or other memory structure pointed to by element pointer 902.

The data structure built according to the flowchart depicted in FIG. 8 may then be used to determine if a particular query element k is a member of set S, where k=$c_1 c_2 \ldots c_q$ for some q≦Z (where "Z" is the maximum possible length of an element in domain Σ), and $c_i \epsilon \Sigma, 1 \leq i \leq q$. According to an embodiment of the present invention, the search may be performed by checking if the following bits in the bit-arrays are set to non-null values: Array[m+1] of slot DS[q][Slot corresponding to $c_q$], Array[Position of $c_q$ in the character set] (i.e., the bit corresponding to character $c_q$) of slot DS[q−1][Slot corresponding to $c_{q-1}$], . . . , Array[Position of $c_3$ in the character set] (i.e., the bit corresponding to character $c_3$) of slot DS[2][Slot corresponding to $c_2$], and Array[Position of $c_2$ in the character set] (i.e., the bit corresponding to character $c_2$) of slot DS[1][Slot corresponding to $c_1$], in that order. If the search fails in any of these bits (i.e., if any of the bits are set to null values), it can be concluded that query element k is not a member of set S. If all of the above bits are set, then it indicates that query element k may be included in set S. The element pointer of slot DS[q][Slot corresponding to $c_q$] is then used to determine if it points to element k or information relevant to element k. If the element pointer points to a table or linked list comprising more than one element (e.g., elements which have the same length and the same last character as query element k), the table or linked list can then be searched to determine if element k is a member of set S.

Figure 10:
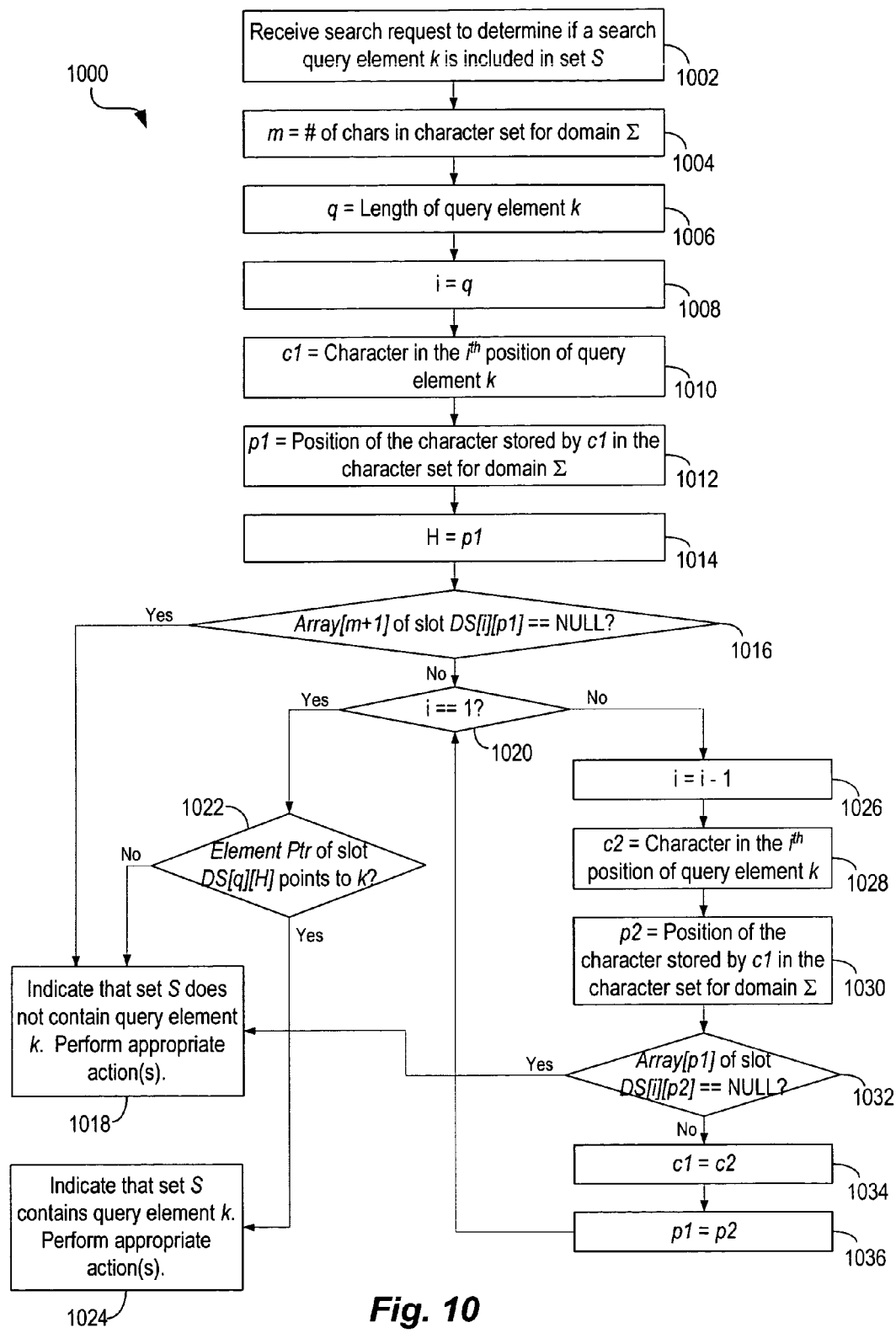
FIG. 10 is a high-level simplified flowchart of a method of determining if set S contains a search query element k according to an embodiment of the present invention applying the second search technique.

FIG. 10 is a high-level simplified flowchart 1000 of a method of determining if set S contains a search query element k according to an embodiment of the present invention applying the second search technique. The method depicted in FIG. 10 may be performed by software modules executing on computer system 100, hardware modules coupled to computer system 100, or combinations thereof. Flowchart 1000 depicted in FIG. 10 is merely illustrative of an embodiment incorporating the present invention and does not limit the scope of the invention as recited in the claims. One of ordinary skill in the art would recognize variations, modifications, and alternatives.

As shown in FIG. 10, processing may be initiated when computer system 100 receives a search request to determine if set S contains a search query element k (step 1002). As previously described, the search request might be specified by a user of computer system 100 using one or more input devices coupled to computer system 100. The search query may also be configured and received from a process executing on computer system, from a device or system coupled to computer system 100 (e.g., a system coupled to computer system 100 via network interface 106), and/or from other systems or processes.

A numeric variable "m" is then set to the number of characters in the character set for domain Σ (step 1004). Another numeric variable "q" is initialized to the length of query element k (i.e., to the number of characters in query element k) (step 1006). A numeric variable "i" is set to the value stored by variable q (step 1008). This variable is used to traverse the various characters of the query element.

A character variable "c1" is then initialized to the character in the $i^{th}$ position of query element k (step 1010). A numeric variable "p1" is then initialized to the position of the character stored by variable c1 in the character set for domain Σ (step 1012). For example, if the character set was the set of English alphabets, then if variable c1 stored character "a" then variable p1 would be set to 1, if variable c1 stored character "f" then variable p1 would be set to 6, if variable c1 stored character "z" then variable p1 would be set to 26, and so on. A numeric variable "H" is set to the value stored by variable p1 (step 1014).

A check is then made to determine if bit Array[m+1] of slot DS[i][p1] is set to null (step 1016). If Array[m+1] of the slot stores a null (or zero) value, it indicates that set S does not contain query element k. A signal may be output to the source of the search request indicating that set S does not contain query element k (step 1018). Other appropriate actions may also be performed in step 1018.

If it is determined in step 1016 that bit Array[m+1] of slot DS[i][p1] stores a non-null value, then a check is made to see if variable i is equal to one (step 1020). If i is equal to one, it indicates that all the characters of query element k have been processed. The element pointer of slot DS[q][H] is then checked to see if it points or refers to element k or to information relevant to element k (step 1022). As described above, the element pointer may point to a plurality of elements which are of the same length as the query element and which have the same last character as the query element. If the element pointer points to a list or table comprising more than one element, then in step 1022, the list or table of elements is searched to determine if query element k is included in the list or table. If the element pointer of slot DS[q][H] does not point to element k (or information relevant to element k), or if the element pointer points to a list or table of elements, and the list or table does not include element k, then a signal may be output to the source of the search request indicating that set S does not contain query element k according to step 1018. Other appropriate actions may also be performed. If the element pointer of slot DS[q][H] points to element k (or information relevant to element k), or if the element pointer points to a list or table of elements that includes element k, then a signal may be output to the source of the search request indicating that set S contains query element k (step 1024). Other appropriate actions may also be performed in step 1024.

Referring back to step 1020, if it is determined that variable i is not equal to one (i.e., all the characters in query element k have not be processed), then the value of variable i is decremented by 1 (step 1026). A character variable "c2" is then initialized to the character in the $i^{th}$ position of query element k (step 1028). A numeric variable "p2" is then initialized to the position of the character stored by variable c2 in the character set for domain Σ (step 1030). A check is then made to determine if bit Array[p1] of slot DS[i][p2] is set to null (step 1032). If Array[p1] of the slot stores a null (or zero) value, it indicates that set S does not contain query element k, and a signal may be output to the source of the search request indicating that set S does not contain query element k according to step 1018. Other appropriate actions may also be performed in step 1018. If Array[p1] of slot DS[i][p2] stores a non-null value, variable c1 is then set to the character stored by variable c2 (step 1034) and variable p1 is set to the value of variable p2 (step 1036). Processing then continues with step 1020 as described above.

As described above, if multiple elements in set S have the same length and the same last character, then those multiple elements map to the same element pointer of a particular slot of a particular node of the data structure built according to the teachings of the second search technique. In this case, the element pointer may point to a vector in a table, a linked list, and the like. If a given query element k maps to the element pointer, then the vector pointed to by the element pointer is searched to determine if query element k is a member of set S. In this scenario, the data structure depicted in FIG. 7 behaves similar to a hash mechanism in that it efficiently reduces that possible set of elements to be searched to a small set which can be searched efficiently without the need for the evaluation of a hash function.

According to the teachings of the present invention, several different techniques may be used to maintain the vector. According to one embodiment, the vector may be maintained as a sorted list so that a binary search can be employed to search the vector to determine if query element k is included in the vector. According to another embodiment, the vector may be maintained as a balanced binary tree (e.g., a red-black tree). Such a balanced binary tree can be searched in O(log Q) time, where Q is the number of elements in the vector. According to yet another embodiment, the vector may be maintained using the data structure built according to the teachings of the first search technique (i.e., the data structure depicted in FIG. 3 and built according to the flowchart depicted in FIG. 5). In this embodiment, the time required to search the vector is proportional to the length of query element k (i.e., proportional to the number of characters in the query element).

The number of comparisons needed to perform the search according to the second technique is proportional to the length of the query element. Thus, the second search technique described above is optimized with respect to the number of comparisons required to determine if a particular search query element is in a particular data set. The second search technique is highly optimized for in-memory searches. The number of comparisons is not dependent on the size of set S. If a given query element is not present in the data structure (i.e., not a member of set S), then only a few bit comparisons (of array pointers) are needed to determine that the element is not in set S. This is in contrast to conventional search techniques that may require multiple element comparisons.

The data structure built according to the teachings of the second search technique enables direct character comparisons without any traversal of a tree for extremely efficient searches. As a consequence, intra-search parallelism techniques (e.g., binary split search, etc.) may also be used to perform the searches. When compared with traditional hash-based search techniques which require that a hash of the entire query element be computed to determine the hash bucket, the present invention does not require any hash to be computed as only the length of the query element and the character positions are used to determine if the query element is a member of set S.

As described above, two search techniques have been described for determining if a query element k is included in set S. The scope of the present invention, as recited in the claims, is however not limited to the search techniques described above. Several other search techniques known to those of ordinary skill in the art are also encompassed within the scope of the present invention.

Figure 11:
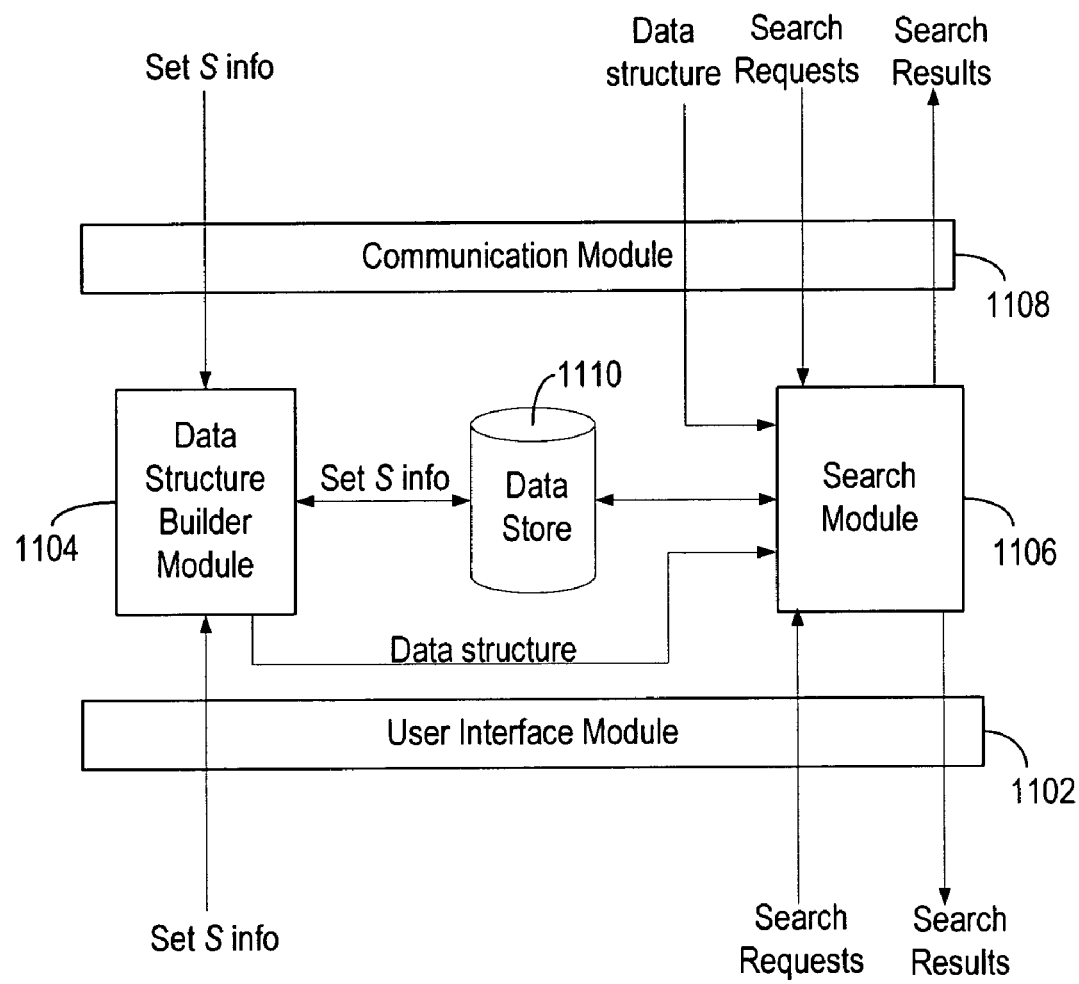
FIG. 11 is a simplified block diagram showing various modules and/or engines which may be used to implement the first and/or the second search technique according to an embodiment of the present invention.

FIG. 11 is a simplified block diagram showing various modules and/or engines which may be used to implement the first and/or the second search technique according to an embodiment of the present invention. The modules depicted in FIG. 11 may be implemented in software or hardware or combinations thereof. As shown in FIG. 11, the modules may include a user interface (UI) module 1102, a data structure builder module 1104, a search module 1106, and a communication module 1108.

Data structure builder module 1104 may be configured to build one or more data structures that are used to perform searches according to the teachings of the present invention. For example, data structure module 1104 may be configured to build the data structures depicted in FIG. 3 (according to the first search technique) and in FIG. 7 (according to the second search technique). Data structure builder module 1104 may access information related to the elements of set S from database 1110. In a networked environment, data structure builder module 104 may receive or access information related to set S from other networks or computer systems via communication module 1108. Information related to set S might also be provided by a user via user interface 1102. The data structure built by data structure builder 1104 may be stored in a memory subsystem (e.g., in the RAM of the computer system) for subsequent use.

Search module 1106 may be configured to perform a search to determine if a query element specified in a search query is included in set S using the data structure(s) built by data structure builder module 1104. Search module 1106 may receive the search query via user interface module 1102. Searching may be performed according to the first search technique, the second search technique, or other techniques. Results of the searches performed by search module 1106 may be output to the user via user interface module 1102. In a networked environment, search module 1106 may receive the search query from other computer systems and networks via communication module 1108 and the search results may be communicated to the source of the search request via communication module 1108. In a network environment, search module 1106 may access the data structures used for the searching via communication module 1108. The data structures used by search module 1106 to perform the searches may also be received from an external computer or network via communication module 1108.

Communication module 1108 may be configured to facilitate communication of information and data to and from the computer system performing processing according to the teachings of the present invention. Communication module 1108 may receive search requests from external entities including external computer systems and networks. Data structures used to facilitate the searches may also be received by communication module 1108 from external entities. Results of searches performed by search module 1106 may be communicated by communication module 1108 to the sources of the requests.

User interface module 1102 provides an interface via which a user may input search queries and receive results of the search queries. According to an embodiment of the present invention, users may also provide information related to set S via interface module 1102.

Data store 1110 may serve as a repository for storing information related to processing performed by data structure builder module 1104 and search module 1106. For example, information related to the elements (or the elements themselves) of set S may be stored in data store 1110.

The techniques according to the present invention described above may be used in various different applications. For example, the techniques may be used for encryption purposes where a set of URIs is searched to determine if a particular URI is included in the set. The techniques may be used to search a set or list of credit card numbers to determine if a particular number is included in the set. An inventory list or set may be searched to determine if a particular item that a user wishes to purchase is included in the inventory. The search techniques provided by the present invention may also be used in various other environments where efficient searches are desired.

It should be apparent that the above description describes only a specific embodiment of the present invention and does not limit the scope of the present invention as recited in the claims. Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of determining if a query element is included in a set of elements comprising one or more elements from a first domain having a character set of "m" characters and "Z" is the maximum possible length of an element in the first domain, the method comprising:
   providing a processor and associated memory;
   using the processor to build a data structure based upon the set of elements, the data structure comprising "Z" memory structures, each memory structure comprising "m" slots, each slot comprising a first memory location and an array of memory locations, each array of memory locations comprising "(m+1)" memory locations;
   storing the data structure using the memory;
   receiving information identifying the query element; and
   using the data structure to determine if the query element is included in the set of elements such that the number of comparisons needed to determine if the query element is included in the set of elements is proportional to a length of the query element and independent of the number of elements in the set of elements;
   wherein building the data structure based upon the set of elements comprises:
   initializing the first memory location and memory locations in the array of memory locations of each slot in each memory structure to null values;
   for each element "R" in the set of elements, where $R=c_1c_2, \ldots c_f$ for some $f \leq Z$, for each $c_i$ where $1 \leq i \leq f$:
   if ("i"<"f"):
   storing a non-null value in a memory location corresponding to character $c_{i+1}$ in the array of memory locations of the slot corresponding to $c_i$ of memory structure i; and
   if("i" is equal to "f"):
   storing a non-null value in the $(m+1)^{th}$ memory location of the array of memory locations of the slot corresponding to $c_i$ of memory structure i; and
   storing a reference to element "R" in the first memory location of the slot corresponding to $c_i$ of memory structure i.

2. The method of claim 1 wherein:
   receiving information identifying the query element comprises:
   receiving information identifying a query element "k", where $k=c_1C_2 \ldots C_q$ for some $q \leq Z$;
   using the data structure to determine if the query element is included in the set of elements comprises:
   outputting a signal indicating that the query element is included in the set of elements if, for each $c_i$ of k:
   if ("i"<"q"), a non-null value is stored in a memory location corresponding to character $c_{i+1}$ in the array of memory locations of the slot corresponding to $c_i$ of memory structure i; and
   if("i" is equal to "q"), a non-null value is stored in the $(m+1)^{th}$ memory location in the array of memory locations of the slot corresponding to $c_i$ of memory structure i, and the first memory location of the slot corresponding to $c_i$ of memory structure i refers to the query element.

3. The method of claim 1 wherein:
   receiving information identifying the query element comprises:
   receiving information identifying a query element "k", where $k=c_1c_2 \ldots c_q$ for some $q \leq Z$; and
   using the data structure to determine if the query element is included in the set of elements comprises:
   outputting a signal indicating that the query element is not included in the set of elements if, for any $c_i$ of k:
   if ("i" is equal to "q"), a null value is stored in the $(m+1)^{th}$ memory location in the array of memory locations of the slot corresponding to $c_i$ of memory structure i, or the first memory location of the slot corresponding to $c_i$ of memory structure i does not refer to the query element; and
   if ("i"<"q"), a null value is stored in a memory location corresponding to character $c_{i+1}$ in the array of memory locations of the slot corresponding to $c_i$ of memory structure i.

4. A computer-implemented system for determining if a query element is included in a set of elements comprising one or more elements from a first domain having a character set of "m" characters, and "Z" is the maximum possible length of an element in the first domain, the system comprising:
   a processor; and
   a memory coupled to the processor, the memory configured to store a plurality of code modules executable by the processor, the plurality of code modules comprising:
   a code module for building a data structure based upon the set of elements, the data structure comprising "Z" memory structures, each memory structure comprising "m" slots, each slot comprising a first memory location and an array of memory locations, each array of memory locations comprising "(m+1)" memory locations;
   a code module for receiving information identifying the query element; and a code module for using the data structure to determine if the query element is included in the set of elements such that the number of comparisons needed to determine if the query element is included in the set of elements is proportional to a length of the query element and independent of the number of elements in the set of elements;

wherein the code module for building the data structure based upon the set of elements comprises:

a code module for initializing the first memory location and memory locations in the array of memory locations of each slot in each memory structure to null values;

for each element "R" in the set of elements, where $R=c_1c_2, \ldots c_f$ for some $f \leq Z$, for each $c_i$ where $1 \leq i \leq f$:

if ("i"<"f"):

a code module for storing a non-null value in a memory location corresponding to character $c_{i+1}$ in the array of memory locations of the slot corresponding to $c_i$ of memory structure i; and if("i" is equal to "f"):

a code module for storing a non-null value in the $(m+1)^{th}$ memory location of the array of memory locations of the slot corresponding to $c_i$ of memory structure i; and a code module for storing a reference to element "R" in the first memory location of the slot corresponding to $c_i$ of memory structure i.

5. The system of claim 4 wherein:

the code module for receiving information identifying the query element comprises:

a code module for receiving information identifying a query element "k", where $k=c_1c_2 \ldots c_q$ for some $q \leq Z$;

the code module for using the data structure to determine if the query element is included in the set of elements comprises:

a code module for outputting a signal indicating that the query element is included in the set of elements if, for each $c_i$ of k:

if ("i"<"q"), a non-null value is stored in a memory location corresponding to character $c_{i+1}$ in the array of memory locations of the slot corresponding to $c_i$ of memory structure i; and if("i" is equal to "q"), a non-null value is stored in the $(m+1)^{th}$ memory location in the array of memory locations of the slot corresponding to $c_i$ of memory structure i, and the first memory location of the slot corresponding to $c_i$ of memory structure i refers to the query element.

6. The system of claim 4 wherein:

the code module for receiving information identifying the query element comprises:

a code module for receiving information identifying a query element "k", where $k=c_1c_2 \ldots c_q$ for some $q \leq Z$; and the code module for using the data structure to determine if the query element is included in the set of elements comprises:

a code module for outputting a signal indicating that the query element is not included in the set of elements if, for any $c_i$ of k:

if("i" is equal to "q"), a null value is stored in the $(m+1)^{th}$ memory location in the array of memory locations of the slot corresponding to $c_i$ of memory structure i, or the first memory location of the slot corresponding to $c_i$ of memory structure i does not refer to the query element; and if ("i"<"q"), a null value is stored in a memory location corresponding to character $c_{i+1}$ in the array of memory locations of the slot corresponding to $c_i$ of memory structure i.

7. A computer program product stored on a computer-readable storage medium for determining if a query element is included in a set of elements comprising one or more elements from a first domain having a character set of "m" characters, and "Z" is the maximum possible length of an element in the first domain, the computer program product comprising:

code for building a data structure based upon the set of elements, the data structure comprising "Z" memory structures, each memory structure comprising "m" slots, each slot comprising a first memory location and an array of memory locations, each array of memory locations comprising "(m+1)" memory locations;

code for receiving information identifying the query element; and code for using the data structure to determine if the query element is included in the set of elements such that the number of comparisons needed to determine if the query element is included in the set of elements is proportional to a length of the query element and independent of the number of elements in the set of elements;

wherein the code for building the data structure based upon the set of elements comprises:

code for initializing the first memory location and memory locations in the array of memory locations of each slot in each memory structure to null values;

for each element "R" in the set of elements, where $R=c_1c_2, \ldots c_f$ for some $f \leq Z$, for each $c_i$ where $1 \leq i \leq f$:

if ("i"<"f"):

code for storing a non-null value in a memory location corresponding to character $c_{i+1}$ in the array of memory locations of the slot corresponding to $c_i$ of memory structure i; and if("i" is equal to "f"):

code for storing a non-null value in the $(m+1)^{th}$ memory location of the array of memory locations of the slot corresponding to $c_i$ of memory structure i; and code for storing a reference to element "R" in the first memory location of the slot corresponding to $c_i$ of memory structure i.

8. The computer program product of claim 7 wherein:

the code for receiving information identifying the query element comprises:

code for receiving information identifying a query element "k", where where $k=c_1c_2 \ldots c_q$ for some $q \leq Z$;

the code for using the data structure to determine if the query element is included in the set of elements comprises:

code for outputting a signal indicating that the query element is included in the set of elements if, for each $c_i$ of k:

if ("i"<"q"), a non-null value is stored in a memory location corresponding to character $c_{i+1}$ in the array of memory locations of the slot corresponding to $c_i$ of memory structure i; and if("i" is equal to "q"), a non-null value is stored in the $(m+1)^{th}$ memory location in the array of memory locations of the slot corresponding to $c_i$ of memory structure i, and the first memory location of the slot corresponding to $c_i$ of memory structure i refers to the query element.

9. The computer program product of claim 7 wherein:

the code for receiving information identifying the query element comprises:

code for receiving information identifying a query element "k", where k=$c_1 c_2 \ldots c_q$ for some q≦Z;

the code for using the data structure to determine if the query element is included in the set of elements comprises:

code for outputting a signal indicating that the query element is not included in the set of elements if, for any $c_i$ of k:

if("i" is equal to "q"), a null value is stored in the $(m+1)^{th}$ memory location in the array of memory locations of the slot corresponding to $c_i$ of memory structure i, or the first memory location of the slot corresponding to $c_i$ of memory structure i does not refer to the query element; and if ("i"<"q"), a null value is stored in a memory location corresponding to character $c_{i+1}$ in the array of memory locations of the slot corresponding to $c_i$ of memory structure i.

\* \* \* \* \*

UNITED STATES PATENT AND TRADEMARK OFFICE
CERTIFICATE OF CORRECTION

PATENT NO. : 7,634,470 B2
APPLICATION NO. : 11/189185
DATED : December 15, 2009
INVENTOR(S) : Rajasekaran et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1173 days.

Signed and Sealed this

Ninth Day of November, 2010

David J. Kappos
*Director of the United States Patent and Trademark Office*